US012525089B2

(12) United States Patent
Higgins et al.

(10) Patent No.: US 12,525,089 B2
(45) Date of Patent: Jan. 13, 2026

(54) PROVIDING INFORMATION ASSOCIATED WITH A VIRTUAL ELEMENT OF A VIRTUAL GAMING ENVIRONMENT

(71) Applicant: IGT, Las Vegas, NV (US)

(72) Inventors: Kevin Higgins, Reno, NV (US); Dwayne Nelson, Las Vegas, NV (US)

(73) Assignee: IGT, Las Vegas, NV (US)

(*) Notice: Subject to any disclaimer, the term of this patent is extended or adjusted under 35 U.S.C. 154(b) by 409 days.

(21) Appl. No.: 18/086,572

(22) Filed: Dec. 21, 2022

(65) Prior Publication Data

US 2024/0212419 A1 Jun. 27, 2024

(51) Int. Cl.
*G07F 17/32* (2006.01)
*G06F 3/01* (2006.01)

(52) U.S. Cl.
CPC .......... *G07F 17/3211* (2013.01); *G06F 3/011* (2013.01); *G07F 17/3237* (2013.01); *G07F 17/3293* (2013.01)

(58) Field of Classification Search
CPC ............. G07F 17/3225; G07F 17/3237; G07F 17/3241; G07F 17/3293; A63F 2300/575; A63F 13/69
See application file for complete search history.

(56) References Cited

U.S. PATENT DOCUMENTS

| | | | | |
|---|---|---|---|---|
| 9,782,668 B1* | 10/2017 | Golden | A63F 13/00 |
| 2019/0130701 A1* | 5/2019 | Simons | H04L 9/3226 |
| 2020/0160320 A1* | 5/2020 | Williams | H04L 9/0897 |
| 2021/0233351 A1* | 7/2021 | Meltzer | G06Q 20/065 |
| 2023/0079127 A1* | 3/2023 | Benedetto | A63F 13/69 |
| 2023/0201725 A1* | 6/2023 | Dalmia | G07F 17/3227 463/40 |
| 2023/0281914 A1* | 9/2023 | Dhaliwal | G06T 19/006 345/419 |

* cited by examiner

*Primary Examiner* — Lawrence S Galka
(74) *Attorney, Agent, or Firm* — Sage Patent Group

(57) ABSTRACT

A system configured to manage a virtual element associated with a virtual gaming environment includes a processor circuit and a memory coupled to the processor circuit. The memory includes machine-readable instructions that, when executed by the processor circuit, cause the system to perform operations. The operations include determining information associated with the virtual element to transmit to an extended reality ("XR") device based on a relationship between a user of the XR device and an entity to which the virtual element is assigned. The operations further include transmitting the information to the XR device.

20 Claims, 13 Drawing Sheets

300 342 350b 346 $435 $201 336b 332b $? 352 356 T T J J Q Q 348 $35 K K A A 310 344 354 334b

PROVIDING INFORMATION ASSOCIATED WITH A VIRTUAL ELEMENT OF A VIRTUAL GAMING ENVIRONMENT

BACKGROUND

As the adoption of virtual reality (VR) technology becomes more widespread, many companies are developing persistent virtual worlds that include simulated and/or enhanced reproductions of real world locations, including gaming environments such as casinos for example. Embodiments described herein relate to virtual reality environments, and in particular to customized display of virtual persons and virtual elements in a virtual reality gaming environments, such as virtual casino environments, based on user preferences, and related devices, systems, and methods. There is a need to manage assignment of the virtual elements amongst the users of the virtual gaming environment and to manage information provided regarded those virtual elements.

BRIEF SUMMARY

According to some embodiments, a system configured to manage a virtual element associated with a virtual gaming environment is provided. The system includes a processor circuit and a memory including machine-readable instructions. When executed by the processor circuit, the instructions cause the processor circuit to perform operations comprising. The operations include determining information associated with the virtual element to transmit to an extended reality ("XR") device based on a relationship between a user of the XR device and an entity to which the virtual element is assigned. The operations further include transmitting the information to the XR device.

According to other embodiments a method of managing a virtual element associated with a virtual game in a virtual gaming environment is provided. The method includes storing an indication that the virtual element is assigned to an entity. The method further includes determining information associated with the virtual element to transmit to an extended reality ("XR") device based on an identity of a user of the XR device and/or based on an identity of the entity. The method further includes transmitting the information to the XR device.

According to other embodiments, an extended reality ("XR") device configured to display a virtual element of a virtual gaming environment is provided. The XR device includes a processor circuit and a memory coupled to the processor circuit. The memory includes machine-readable instructions that, when executed by the processor circuit, cause the XR device to perform operations. The operations include transmitting an indication of a user associated with the XR device to a remote device. The operations further include, subsequent to transmitting the indication of the user associated with the XR device to the remote device, receiving information associated with the virtual element from the remote device. The operations further include determining that the virtual element is within a field of view of the XR device. The operations further include displaying the virtual element based on the information.

According to other embodiments, a system configured to manage assignment of a virtual element associated with a virtual gaming environment is provided. The system includes a processor circuit and a memory coupled to the processor circuit. The memory includes machine-readable instructions that, when executed by the processor circuit, cause the system to perform operations. The operations include determining that the virtual element is assigned to a first entity. The operations further include determining that the virtual element has changed possession within the virtual gaming environment. The operations further include, responsive to determining that the virtual element has changed possession within the virtual gaming environment, determining whether to change an assignment of the virtual element.

According to other embodiments, a method of managing assignment of a virtual element associated with a virtual gaming environment is provided. The method includes determining that the virtual element has changed possession within the virtual gaming environment. The method further includes, responsive to determining that the virtual element has changed possession within the virtual gaming environment, determining whether to change an assignment of the virtual element. The method further includes transmitting a signal to an XR device based on determining whether to change the assignment of the virtual element.

According to other embodiments, an extended reality ("XR") device configured to manage assignment of a virtual element of a virtual gaming environment is provided. The XR device includes a processor circuit and a memory coupled to the processor circuit. The memory includes machine-readable instructions that, when executed by the processor circuit, cause the XR device to perform operations. The operations include receiving an indication that the virtual element has changed possession within the virtual gaming environment. The virtual element is assigned to a user associated with the XR device. The operations further include determining whether the user intends the virtual element to be reassigned. The operations further include transmitting an indication of whether the user intends the virtual element to be reassigned.

According to other embodiments, a system configured to manage a virtual element associated with a virtual gaming environment is provided. The system includes a processor circuit and a memory coupled to the processor circuit. The memory includes machine-readable instructions that, when executed by the processor circuit, cause the system to perform operations. The operations include receiving a request to perform an action associated with the virtual element. The operations further include determining information associated with the virtual element. The operations further include determining whether to perform the action associated with the virtual element based on the information associated with the virtual element. The operations further include subsequent to determining whether to perform the action associated with the virtual element, transmitting an indication of whether the action has been performed.

According to other embodiments, a method of managing a virtual element associated with a virtual gaming environment is provided. The method includes determining information associated with the virtual element. The method further includes limiting manipulation of the virtual element within the virtual gaming environment based on the information associated with the virtual element and an identity of an entity attempting to manipulate the virtual element.

According to other embodiments, an extended reality ("XR") device configured to manage a virtual element of a virtual gaming environment is provided. The XR device includes a processor circuit and a memory coupled to the processor circuit. The memory includes machine-readable instructions that, when executed by the processor circuit, cause the XR device to perform operations. The operations include determining that a user of the XR device is attempting to perform an action associated with the virtual element. The operations further include transmitting an indication of an identity of the user and an indication of the action. The operations further include receiving an indication of whether the user is permitted to perform the action. The operations further include displaying the virtual element based on the indication.

According to other embodiments, a system configured to monitor a virtual element associated with a virtual gaming environment is provided. The system includes a processor circuit and a memory coupled to the processor circuit. The memory includes machine-readable instructions that, when executed by the processor circuit, cause the system to perform operations. The operations include determining that an entity interacted with the virtual element within the virtual gaming environment. The operations further include storing an indication that the entity interacted with the virtual element. The operations further include generating a report associated with the virtual element and/or the entity based on the indication.

According to other embodiments, a method of monitoring a virtual element associated with a virtual gaming environment is provided. The method includes determining that an entity interacted with the virtual element within the virtual gaming environment. The method further includes storing an indication that the entity interacted with the virtual element. The method further includes receiving a request to perform an action associated with the entity and/or the virtual element. The method further includes determining whether to perform the action based on the indication that the entity interacted with the virtual element.

According to other embodiments, an extended reality ("XR") device configured to display a virtual element of a virtual gaming environment is provided. The XR device includes a processor circuit and a memory coupled to the processor circuit. The memory includes machine-readable instructions that, when executed by the processor circuit, cause the XR device to perform operations. The operations include determining that an entity has interacted with the virtual element within the virtual gaming environment. The operations further include transmitting an indication that the entity has interacted with the virtual element to a remote device associated with the virtual gaming environment.

According to various embodiments, electronic gaming machines ("EGMs"), systems, methods, and non-transitory computer-readable medium are provided for performing the above embodiments.

DETAILED DESCRIPTION

Figure 1:
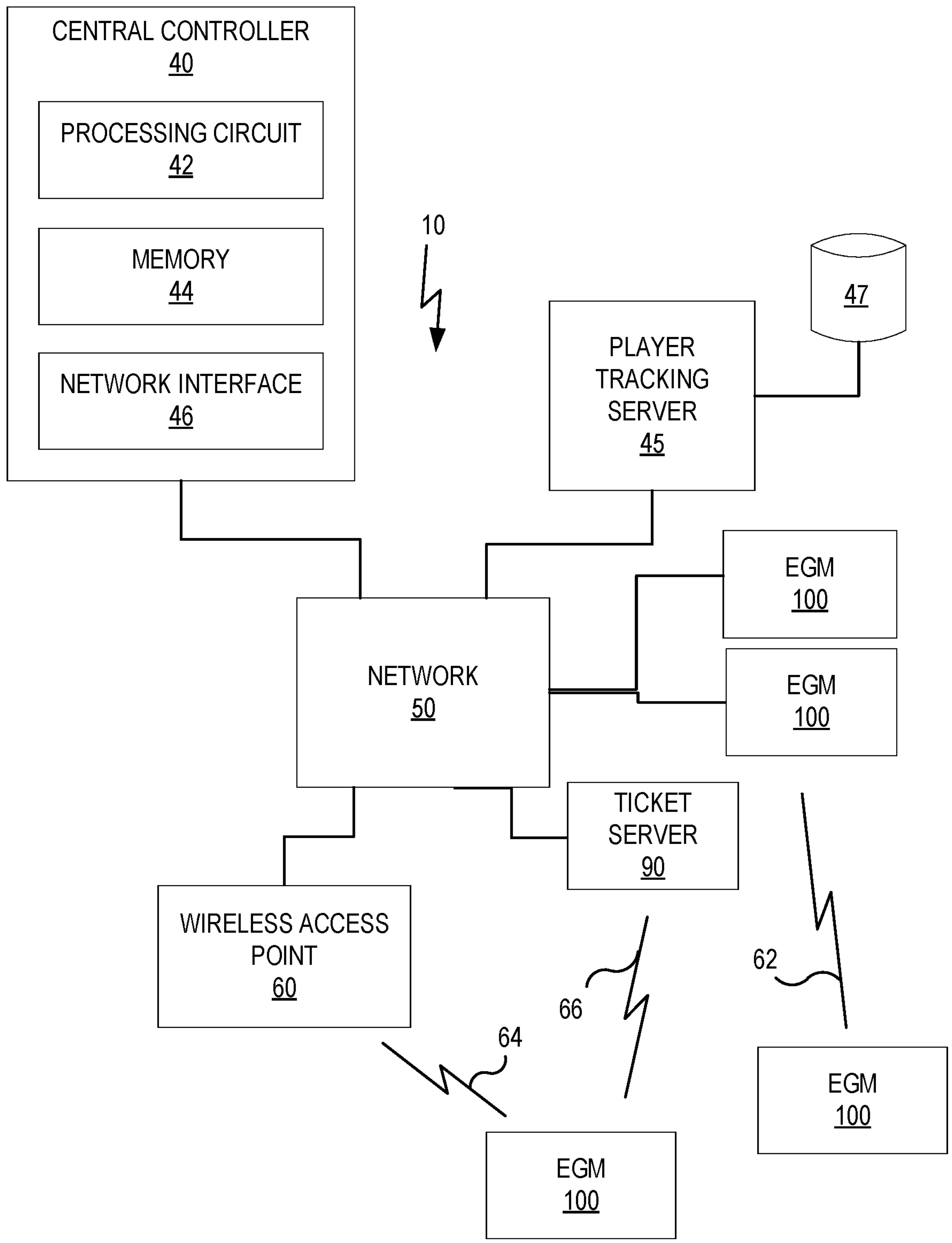
FIG. 1 is a schematic block diagram illustrating an example of a network configuration for a plurality of gaming devices according to some embodiments.

Extended reality ("XR") technology (e.g., virtual reality ("VR") or augmented reality ("AR") can be used to create virtual versions of real-world environments with unique benefits. For example, XR can be used to create a virtual gaming environment based on a real-world casino that can be accessed from remote locations. However, the unlimited capabilities of a virtual gaming environment can lead to undesired results. In some examples, anonymity and detachment from reality can encourage some users to forget real-world customs and etiquette. Therefore, it may be important to place some restrictions on virtual gaming environments to make them more like reality, to meet some regulatory requirements, and to encourage players to trust the virtual gaming environment as they would a real-world gaming environment (e.g., a casino).

In some examples, it may be important to limit information associated with some virtual elements that are provided to some users. In additional or alternative examples, it may be important to limit control and/or transfer of some virtual elements. In additional or alternative examples, it may be important to monitor, log, and report events associated with virtual elements in the virtual gaming environment.

Various embodiments described herein relate to virtual reality environments, and in particular to customized display of virtual persons and virtual elements in a virtual reality gaming environments, such as virtual casino environments, based on user preferences, and related devices, systems, and methods.

While many embodiments are described in regards of Electronic Gaming Machines ("EGMs"), the ideas can apply to sports wagering terminal, kiosks, table games, the casino floor, shopping, or other services of the property (e.g., a restaurant or retail store). In general, the examples herein will be described in regards to a VR casino or a real-world casino with AR elements, however, the innovations may be applied to any XR environment. An example of VR includes a player sitting in her living room using a VR headset to experience a virtual casino. An example of an AR example includes a player visiting a real-world casino and using an AR device to augment the experience.

In some examples, a VR system may include a headset as well as sensors to track a movement of a player (e.g., movement of their hands or body). The VR system may also record the player's voice, eye movement, and/or other behaviors. 3D animations of the player and/or player behaviors may be selectively recorded for future use. In some embodiments, personally identifiable aspects of a recorded player may be anonymized, as needed or desired, e.g., as may be required by a particular jurisdiction and/or to facilitate player acceptance. For example, the system may notice a recorded player is a female of a certain age range and may replace the player's recorded voice with a simulated voice corresponding to the player's gender and/or age range. The system might record and store recordings of any number of common activities, behaviors, and/or reactions, such as small wins, big wins, near wins, happy players, players looking for a machine, walking around, etc. Many types of cameras, gloves (e.g., finger tracking and/or motion tracking gloves), clothing and/or sensors may be used to capture or track body motion.

Before discussing these and other embodiments in greater detail, reference will be made to an example of a gaming system for implementing embodiments disclosed herein. In this regard, FIG. 1 illustrates a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The wireless interfaces 62, 66 allow a plurality of virtual reality (VR) and/or augmented reality (AR) devices, referred to herein as VR/AR devices 200, to coordinate the generation and rendering of VR and/or AR images to the player. As used herein, VR/AR devices 200 may include VR and/or AR functionality, as desired. In some embodiments, the gaming system 10 includes a VR/AR controller 114. The VR/AR controller 114 may be a computing system that communicates through the data communication network 50 with the EGMs 100 and the VR devices 200 to coordinate the generation and rendering of virtual images to one or more players using the VR devices 200. The VR/AR controller 114 may be implemented within or separately from the central controller 40.

In some embodiments, the VR/AR controller 114 may coordinate the generation and display of the virtual images of the same virtual object to more than one player by more than one VR/AR device 200. As described in more detail below, this may enable multiple players to interact with the same virtual object together in real time. This feature can be used to provide a shared multiplayer experience to multiple players at the same time.

Moreover, in some embodiments, the VR/AR controller 114 may coordinate the generation and display of the same virtual object to players at different physical locations, as will be described in more detail below.

The VR/AR controller 114 may store a three-dimensional wireframe map of a gaming area, such as a casino floor, and may provide the three-dimensional wireframe map to the VR/AR devices 200. The wireframe map may store various information about EGMs in the gaming area, such as the identity, type and location of various types of EGMs. The three-dimensional wireframe map may enable a VR/AR device 200 to more quickly and accurately determine its position and/or orientation within the gaming area, and also may enable the VR/AR device 200 to assist the player in navigating the gaming area while using the VR/AR device 200. The generation of three-dimensional wireframe maps is described in more detail below.

In some embodiments, at least some processing of virtual images and/or objects that are rendered by the VR devices 200 may be performed by the VR/AR controller 114, thereby offloading at least some processing requirements from the VR devices 200.

Figure 2A:
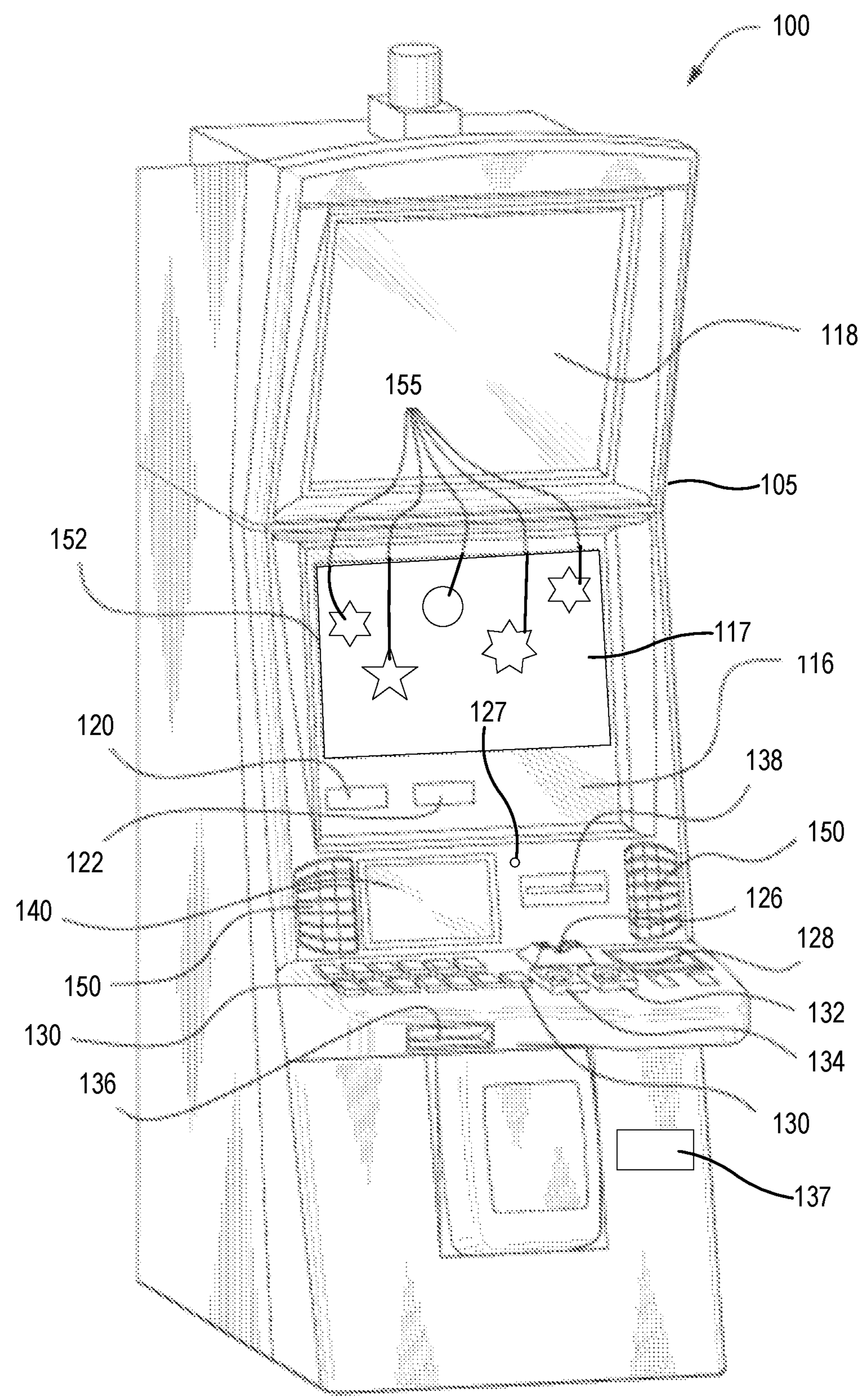
FIG. 2A is a perspective view illustrating an example of a gaming device that can be configured according to some embodiments.
Figure 2B:
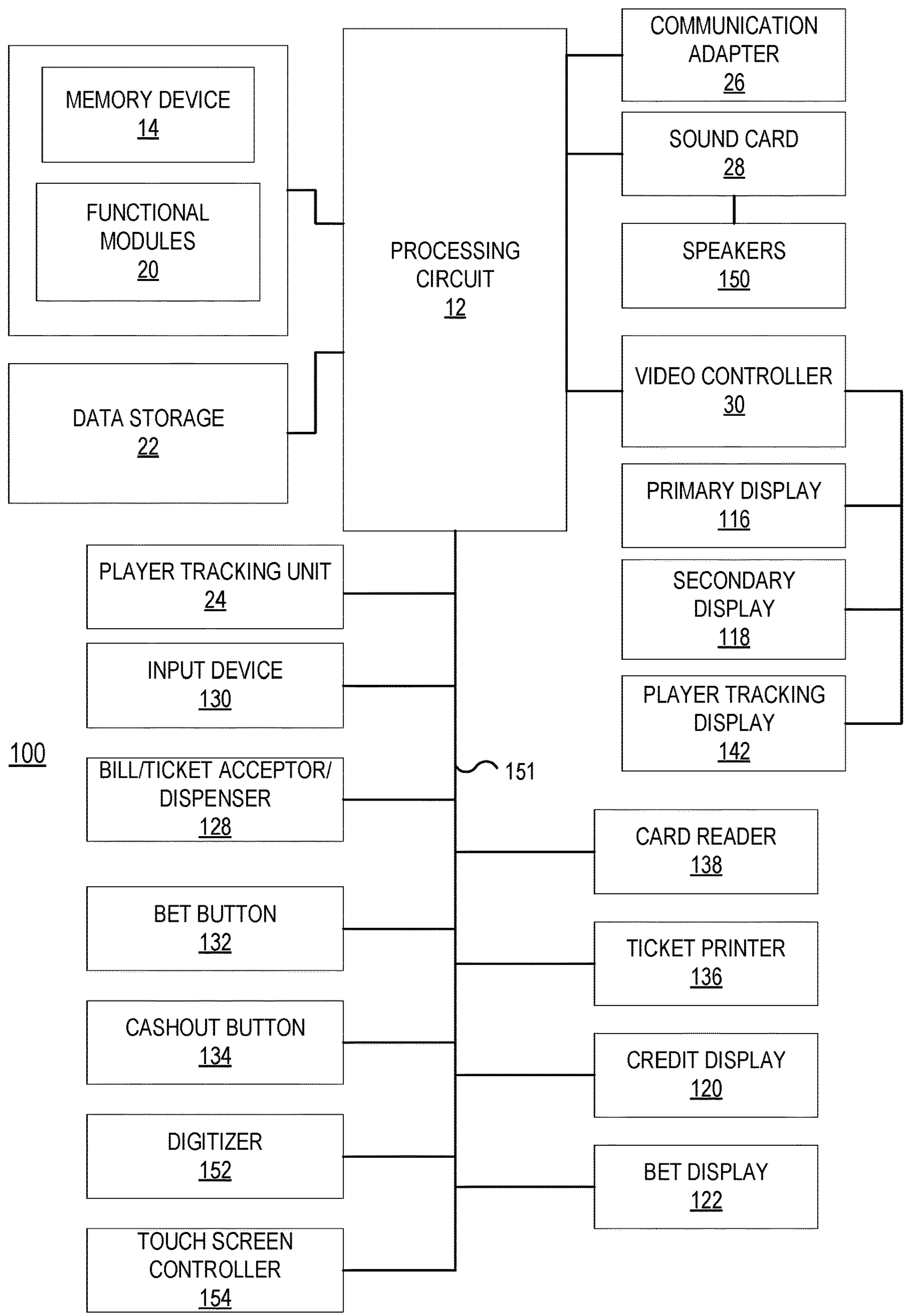
FIG. 2B is a schematic block diagram illustrating an example of an electronic configuration for a gaming device according to some embodiments.
Figure 2C:
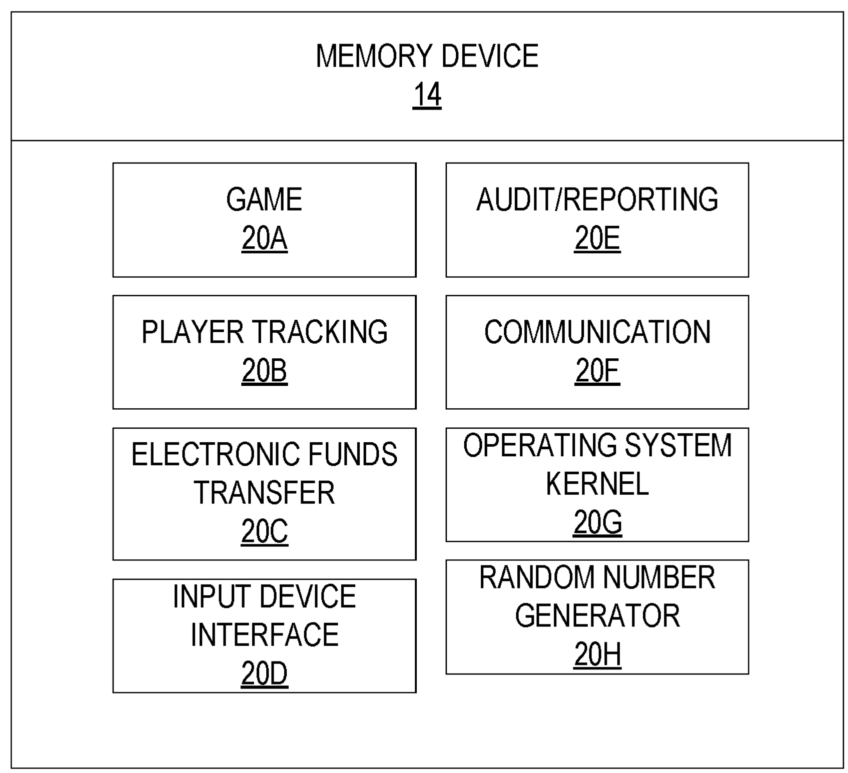
FIG. 2C is a schematic block diagram illustrating an example of various functional modules of a gaming device according to some embodiments.

Embodiments herein may include different types of gaming devices. One example of a gaming device includes a gaming device 100 that can use gesture, voice, and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
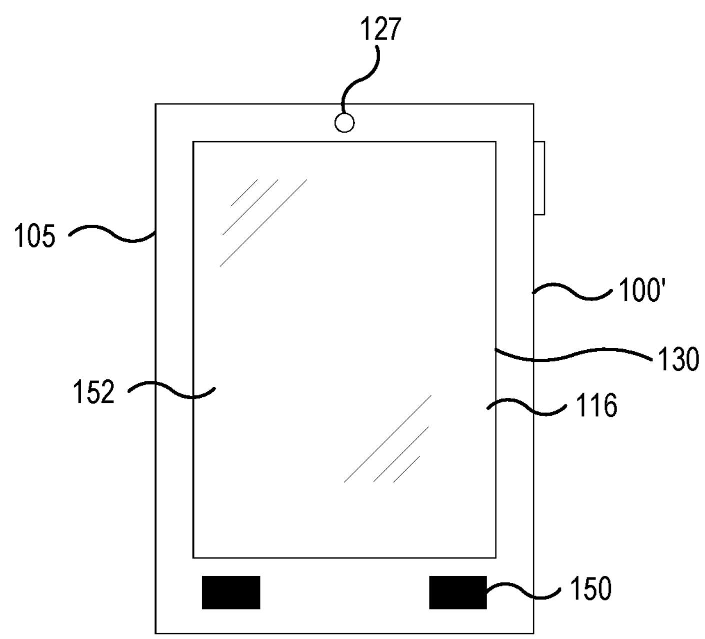
FIG. 2D is perspective view illustrating an example of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
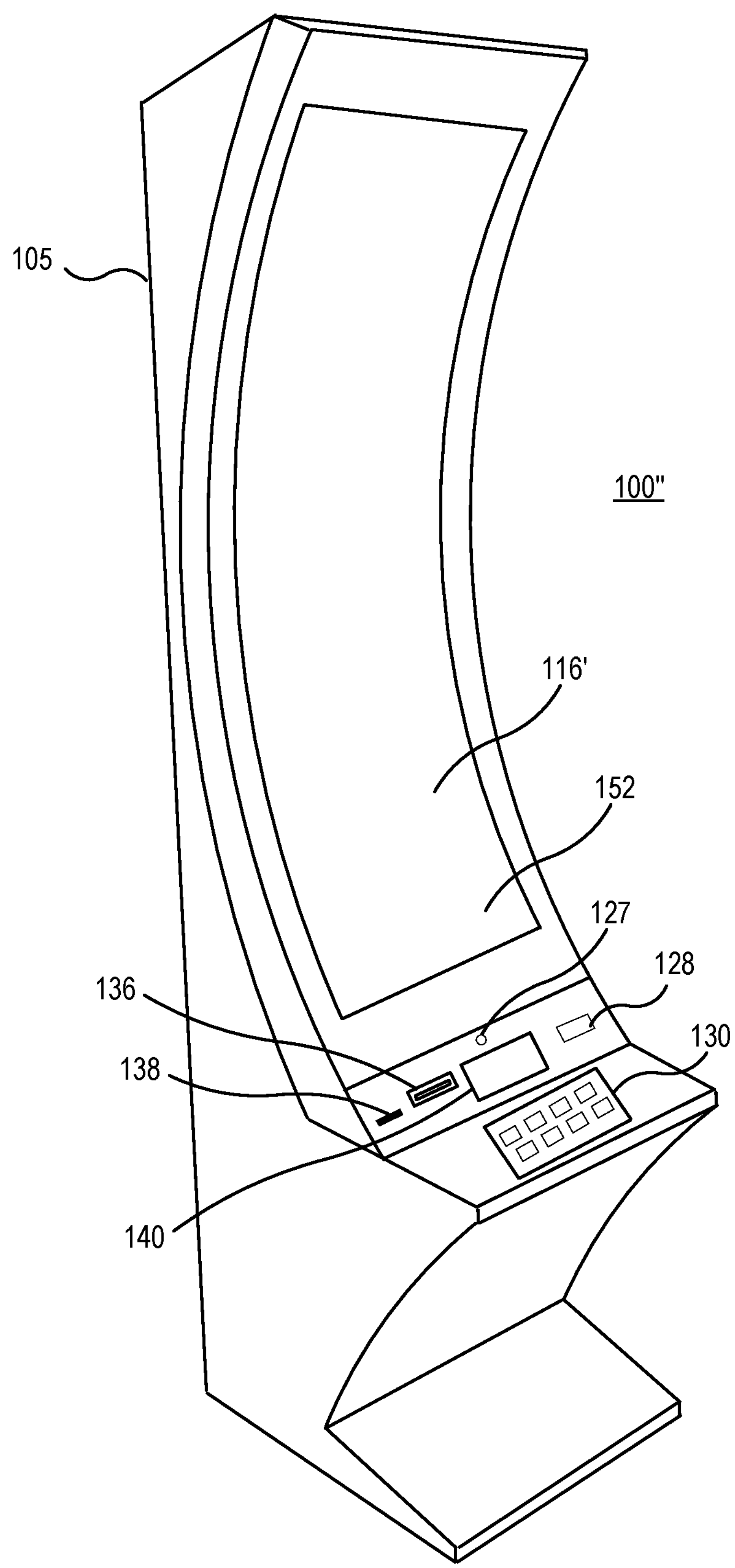
FIG. 2E is a perspective view illustrating an example of a gaming device according to some embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Figure 2F:
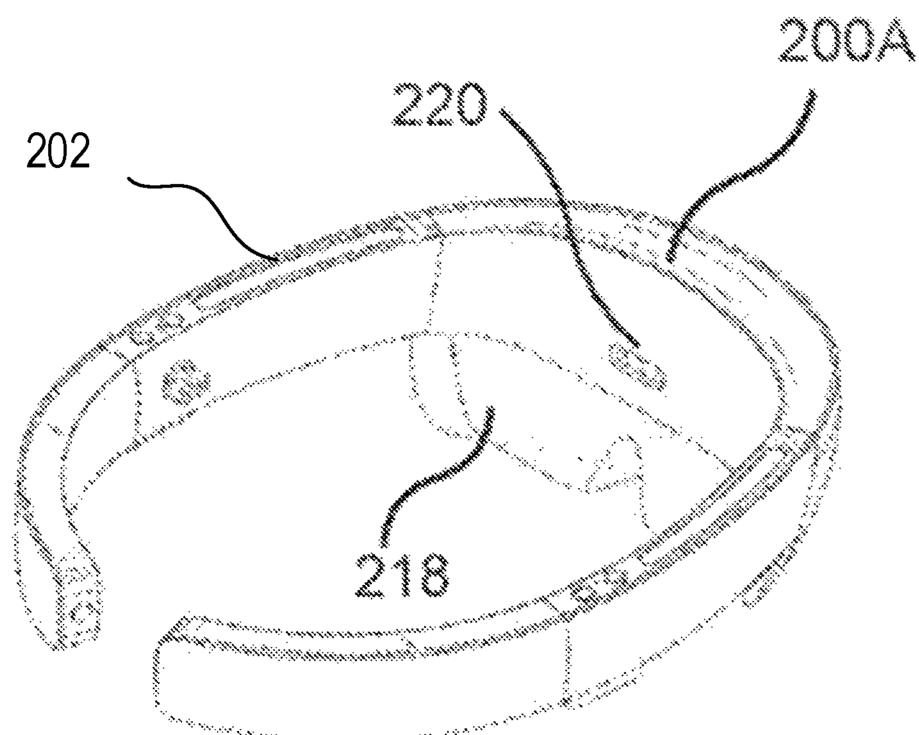
FIGS. 2F-G are schematic diagrams illustrating examples of VR/AR devices according to some embodiments.

FIG. 2F illustrates a virtual reality (VR) viewer 200A implemented as a 3D headset including a pair of displays 218 on which images of virtual objects may be displayed. The viewer 200A includes a head-wearable frame 202, with the displays 218 coupled to the frame 202 to position the display device in a field of view of user wearing the viewer 200A. Different stereoscopic images may be displayed on the displays 218 to create an appearance of depth. The VR viewer 200A may include a plurality of sensors 220 that the device uses to determine a position, orientation, and/or movement of the viewer 200A, which may be used to determine a position, orientation, and/or direction of movement within an SVE.

The viewer 200A may further include other sensors, such as a gyroscopic sensor, a GPS sensor, one or more accelerometers, and/or other sensors that allow the viewer 200A to determine its position and orientation in space. In some embodiments, the viewer 200A may include one or more cameras that allow the viewer 200A to determine its position and/or orientation in space using visual simultaneous localization and mapping (VSLAM). viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real world objects around the user and allows the user to interact with the 3D object.

Figure 2G:
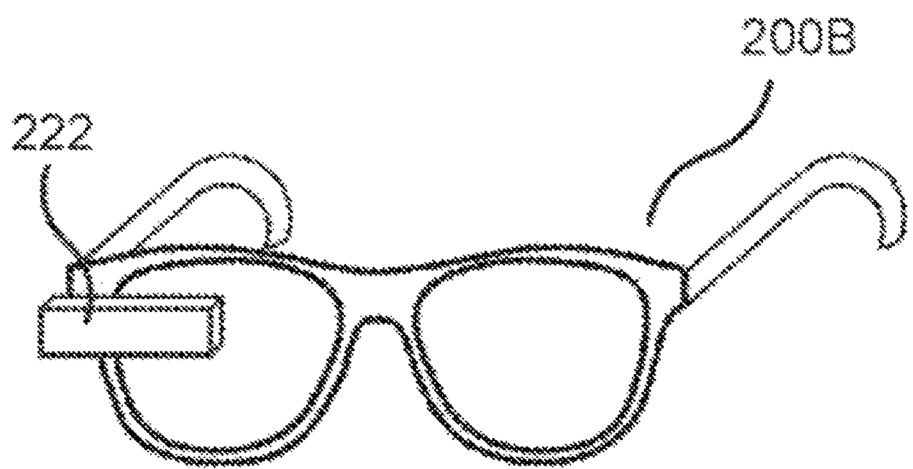

Referring to FIG. 2G, an augmented reality (AR) viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

In a VR world or AR world, casino games may include one or more virtual elements that are critical aspects of the game being played. For example, players who are playing a virtual poker game in a VR environment may interact with a virtual dealer, who then deals cards to the appropriate players during the poker game. In some games cards will be dealt to individual players and/or to the dealer (e.g., in blackjack). In other games cards will be dealt to individual players and/or to a community pool (e.g., in Texas Hold'em). In some games, cards may be returned from a player to the dealer during the course of a game or round.

In a VR or AR world, malicious players could attempt to steal or interact with game elements assigned to a given player, the dealer, or the community, and thereby disrupt the course of a game. It is also possible for other players in the virtual world who may not be participating in the game to walk up to a table game and attempt to interact with the course of the game in malicious ways and ultimately disrupt the game. This may not happen in a physical world as casino patrons are very likely to get held by casino security and kicked out of the casino. In a virtual world, however, this physical threat that encourages civil behavior in the physical world does not exist, and therefore another approach must be taken. It is also possible for virtual casino employees who play some role in the game, such as a virtual dealer, to perform malicious activities, such as dealing a card from the bottom of the deck to their friend. Some embodiments herein propose that the virtual environment enforce rules and restrictions that can prevent players from performing malicious activity that impact the play of casino games in a virtual environment.

In some embodiments, during the flow of a casino game (e.g., a table game), game elements are initially assigned to an owner and that owner can only perform certain actions with the game elements that are allowed by the rules of the virtual casino game. In some examples, when a dealer opens a virtual casino table, they may be assigned a deck of virtual cards, or a collection of decks of virtual cards, and the dealer can only perform well-defined actions on those cards while their table is open (e.g., during the course of a hand or play of the game). This action can be referred to as an "initial assignment event" and specific rules can define how the initial owner of the game element(s) can re-assign, or trigger a "re-assignment event" during the course of the game (e.g., during a hand at a table game) or a shift. For example, in a blackjack game, the dealer may be assigned 10 decks of cards by the system (the "initial assignment event"), and then during a hand of the table game, they may deal cards from the deck (the system may shuffle the virtual deck) and trigger "re-assignment events" and deal cards to registered players at the virtual table.

In some embodiments, "re-assignment events" can only be performed with players who have completed a bet within the proper interval, or completed a bet equal to or greater than a required amount within the hand when it's the player's turn in a round or hand. It is also possible for game element "re-assignment events" to be triggered by players (that is, by entities other than the dealer at a table game) during other points of the game, but not during others, and player triggered "re-assignment events" may only be between the player and the dealer or the player and the table or "discard pile" (thereby restricting re-assignment events from being triggered between players). At the end of the game, a "re-assignment event" may be automatically triggered in order to re-associate the game elements with the table, dealer, discard pile, etc. A "re-assignment event" may also be automatically triggered if a player leaves a game, which can happen quite commonly in a VR or AR environment, as players could choose to leave the game. For example, players may become disconnected for whatever reason, their battery dies, the player hits a responsible gaming limit (time-based or wager-based limit), etc.

At the end of a game, the game elements re-assigned to the virtual table, or dealer of the virtual table may be used by the dealer for the next hand or play of the game. In other embodiments, the game elements may be completely discarded by the virtual game, and new ones created and assigned to the dealer via an "initial assignment event" at the start or beginning of the next game round, game cycle, or hand.

Figure 3A:
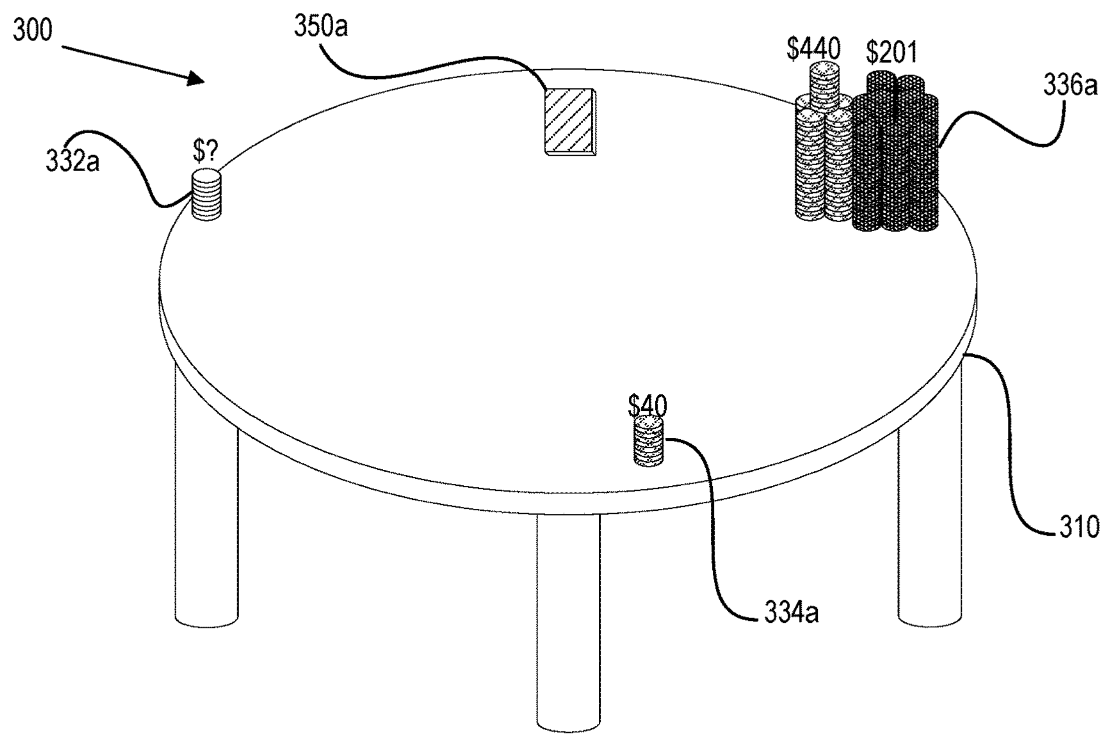
FIGS. 3A-B are schematic diagrams illustrating examples of a virtual gaming environment including virtual elements from a perspective of a user according to some embodiments.
Figure 3B:
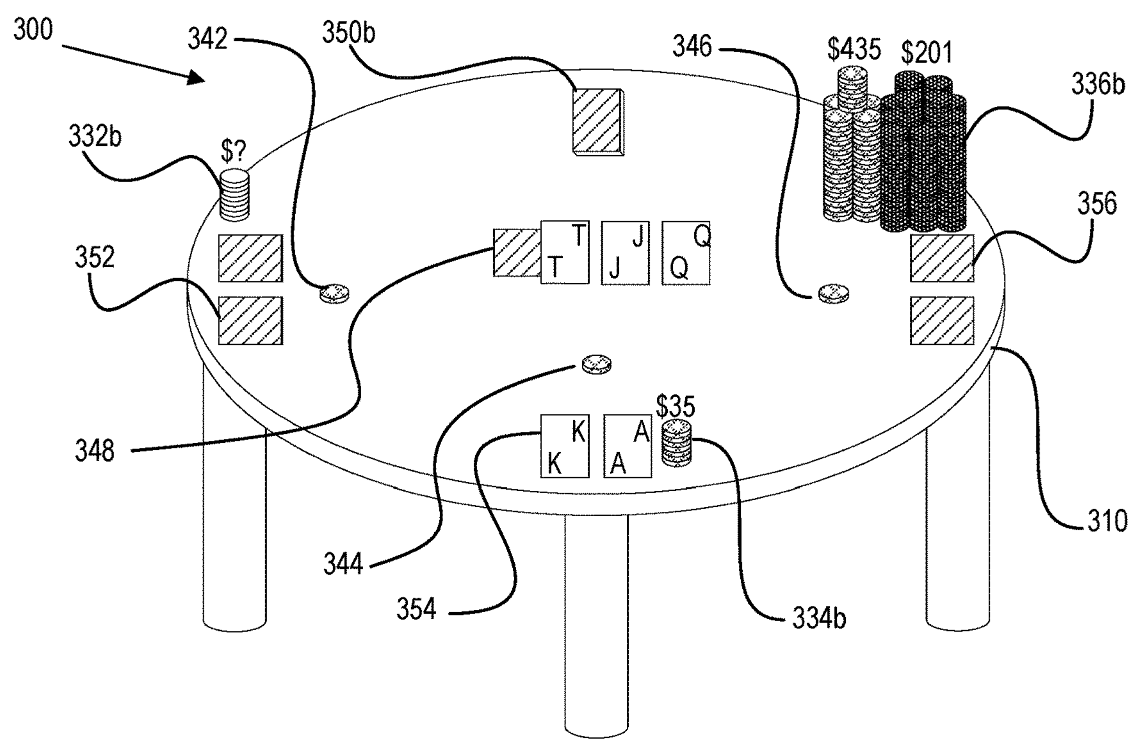

FIGS. 3A-B illustrate examples of a view of a virtual table 310 in a virtual gaming environment 300 at two different points during a virtual game (e.g., Texas Hold'em) from the perspective of one player (e.g., via an XR device). In FIG. 3A, a virtual deck of cards **350*a* may be assigned to a dealer positioned across the virtual table 310 from the player. A stack of virtual chips 334*a* may belong to the player and be positioned in front of the player. Here each of the virtual chips 334*a* has a specific pattern to indicate each of their values ($5) and an indicator above the virtual chips 334*a* indicate the total value of the virtual chips ($40). Other virtual chips 332*a* and 336*a* are visible at the virtual table 310. Virtual chips 332*a* may be assigned to a player on the left. In this example, virtual chips 332*a* include a stack of blank chips (e.g., no pattern to indicate their specific value), which may be symbolic virtual chips (e.g., not correlated to an actual number of virtual chips possessed by the player and/or not correlated to an amount of money available to the player). Virtual chips 332*a* may be considered symbolic or anonymous and may be this way because of the virtual game being played or a relationship (or lack thereof) between the player to which virtual chips 332*a* are assigned and the player viewing the virtual chips 332*a*. By contrast, information associated with virtual chips 336*a* (e.g., a value of each chip and/or the total value of the virtual chips 336*a*) is visible. In some examples, virtual chips 336*a* may be assigned to a player on the right, which may be on a predetermined friend list of the player viewing virtual chips 336*a***.

In additional or alternative embodiments, the different virtual elements (e.g., the virtual deck of cards **350*a* and virtual chips 332*a*, 334*a*, 336*a*) may have different restrictions as to how they can be manipulated and/or transferred based on who they are assigned to. For example, virtual chips 334*a* may only be wagered by the player to which they are assigned (here the player viewing the virtual gaming environment 300**).

In FIG. 3B, the virtual game (e.g., Texas Hold'em) is in progress. Virtual chips 342, 344, 346 have been wagered (e.g., from virtual chips **332*a*, 334*a*, 336*a* of FIG. 3A). As illustrated, virtual chips 334*b* and 336*b* have one less chip than virtual chips 334*a* and 336*a* (corresponding to the virtual chip 344 and 346 that was wagered). However, virtual chips 332*b* appears unchanged as these virtual chips are still symbolic or anonymous. Virtual cards 352, 354, 356 have been dealt (and potentially assigned) to the three players respectively. Furthermore, virtual cards 348 have been dealt (and potentially assigned) to the table. Although not illustrated, the virtual deck of cards 350*b* may have ten fewer virtual cards in response to the ten virtual cards 352, 354, 356, 348 that have been dealt. In this example, the player viewing the virtual cards 352, 354, 356, 348 sees a value for both virtual cards 354 dealt to the player and one of the virtual cards dealt 348 dealt to the table. This may be based on rules associated with the virtual game. Here, one of the virtual cards 348 was burned (is not revealed to any players) and the other three virtual cards (a ten, jack, and queen) were revealed as community cards. A value of virtual cards 354 (a king and an ace) were revealed to the player viewing the virtual gaming environment (e.g., the player to whom the virtual cards 354** are assigned).

Figure 4:
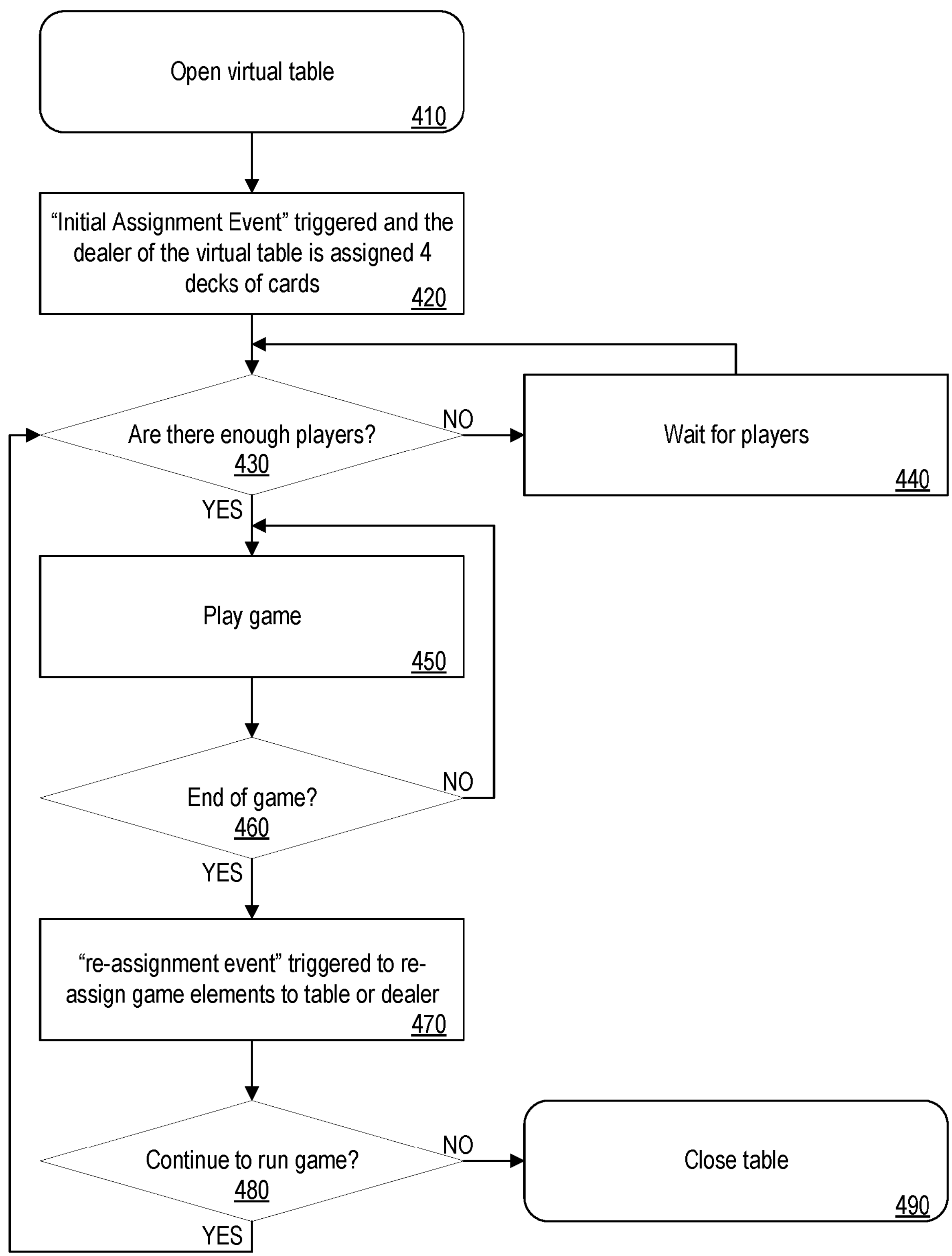
FIG. 4 is a flow chart illustrating an example of operations performed during a virtual game according to some embodiments.

The flowchart of FIG. 4 illustrates an example "initial assignment event" scenario, when a dealer opens a virtual table. At block 410, a virtual table within a virtual gaming environment is opened. At block 420, an initial assignment event is triggered and the dealer of the virtual table is assigned four decks of cards. At block 430, a system operating a virtual game at the virtual table or the dealer can check whether there are enough players to play the virtual game. If not, the system or dealer can wait for additional players (block 440). Once there are enough players, the virtual game can be played (block 450). At block 460, the system or dealer can determine whether the virtual game has ended. If not, the game can continue to be played (block 450). Otherwise, at block 470, after determining that the game has ended, a re-assignment event can be triggered to reassign game elements to the virtual table or the dealer. At block 480, the system or dealer can decide whether to play a new virtual game at the virtual table or to close the virtual table (block 490).

Figure 5:
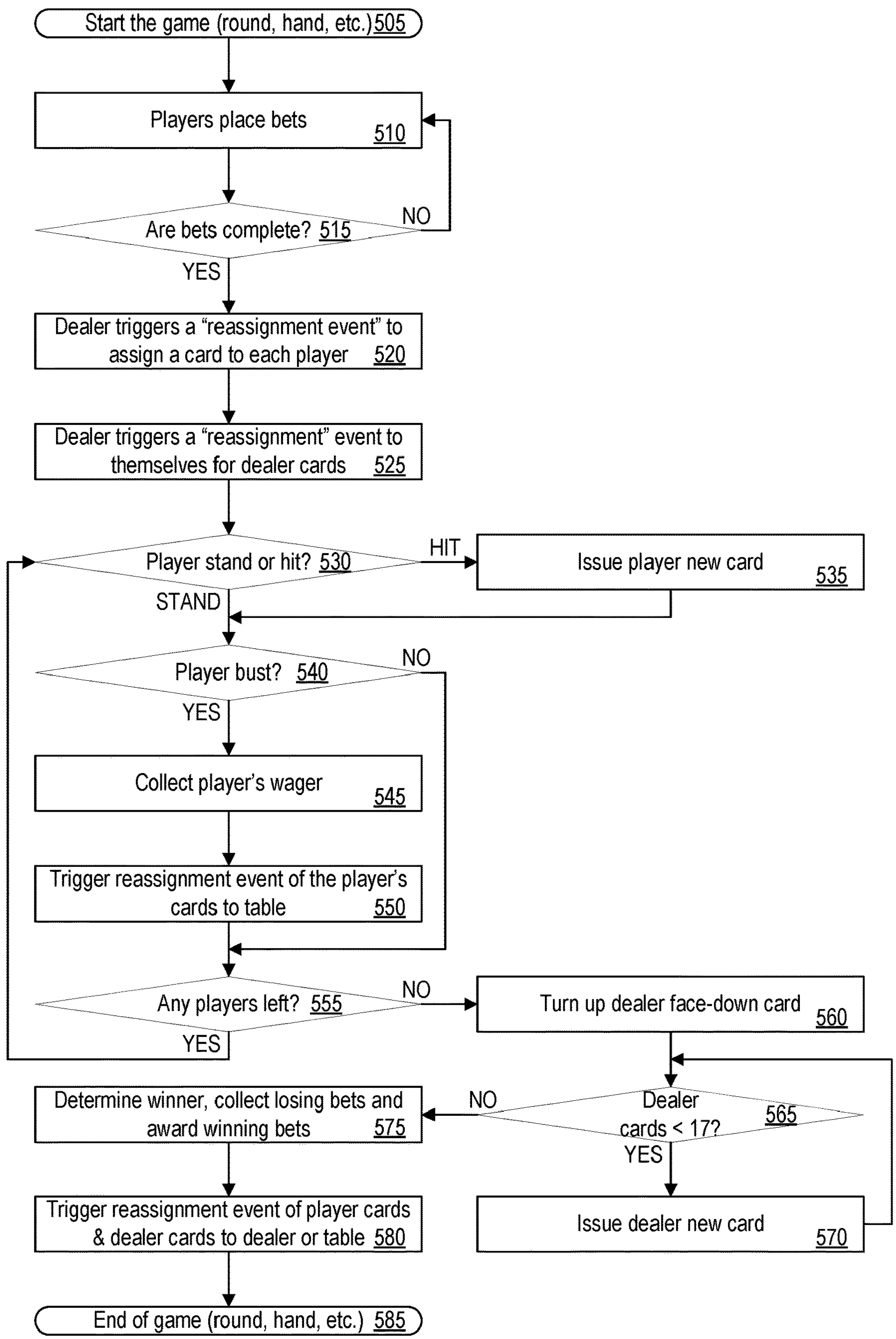
FIG. 5 is a flow chart illustrating an example of operations performed during a virtual blackjack game according to some embodiments.

The flowchart of FIG. 5 illustrates an example of a logical flow of operations performed while playing a virtual game of blackjack according to some embodiments.

At block 505, the virtual game (e.g., a round or hand) is initiated. In some embodiments, initiation of the virtual game may include a dealer and/or a virtual table associated with the virtual game being assigned a virtual deck of cards. In additional or alternative embodiments, the virtual deck of cards may be visible to all players but the value of individual virtual cards of the virtual deck of cards may not be visible to any players or only visible to the dealer. In additional or alternative embodiments, the virtual deck of cards may only be manipulatable by the dealer.

At block 510, players can place bets (e.g., using virtual chips). In some embodiments, the players may perform a transaction to obtain virtual chips from the dealer and/or operator of the virtual gaming environment. In some examples, the virtual chips are only visible by the player to which the virtual chips are assigned. In some examples, symbolic virtual chips are visible to some players, but the symbolic virtual chips may be unrelated to an actual value of the virtual chips assigned to the player. Similarly, manipulation of the symbolic virtual chips by other players may have no effect on the virtual chips that are assigned to the player (which may be correlated with a real-world currency). In additional or alternative examples, some players (including the player to which the virtual chips are assigned), may be able to see the virtual chips including an indication of a value of each chip. Some players may be able to manipulate (e.g., take, move, wager) the virtual chips. In additional or alternative examples, the level at which a player is able to see and/or manipulate a virtual element (e.g., virtual chips) may be based on a relationship between the player and the player to which the virtual element is assigned.

At block 515, the system or dealer can determine whether betting is complete. In some embodiments, a dealer can be prevented from starting a game and/or including a player in a virtual game if the player failed to place a valid bet.

At block 520, the dealer triggers a re-assignment event to assign a virtual card to each player. For example, a virtual deck of cards may have been initially assigned to the dealer at the start of the game and the dealer may request a virtual card be assigned to a player by attempting to deal the player the virtual card from the virtual deck of cards. In some embodiments, a value of the virtual cards dealt to a player may be visible by all players. In additional or alternative embodiments, a value of the virtual cards dealt to a player may only be visible to the player to which they were dealt/assigned. In additional or alternative embodiments, the virtual cards may only be movable by the player to which they were dealt/assigned.

At block 530, the dealer triggers a reassignment event to themselves for dealers cards. For example, the dealer may attempt to separately assign a virtual card from the virtual deck of cards to a hand associated with the dealer. In some embodiments, a value of the first card dealt to the dealer may not be visible to any player. In additional or alternative embodiments, a value of the second card dealt to the dealer may be visible to all players. In additional or alternative embodiments, if the second card has a value of a ten or an ace, the dealer may receive an indicator of whether a combination of the first card and the second card equal 21.

As described above, one type of game element (also referred to herein as a virtual element or a virtual game element) that could be assigned or re-assigned in a virtual game within a virtual environment includes virtual cards of a virtual card game, but other game elements can also be managed with these innovations. One example described above includes virtual chips used in a table game, where a player may be assigned virtual chips when they perform a buy-in, and then during play of a game, or a hand they re-assign those virtual chips to the "table" or "dealer" as they place bets. The dealer, in turn, may re-assign virtual chips to other players at the table when they win a virtual game. Players can also assign virtual game elements to non-players for certain types of virtual games, as allowed by the rules of a particular virtual game. For example, in a virtual environment, the player may bet using chips at a table game which were assigned to them when an "initial assignment event" was triggered when the player performed a buy-in. The player may then trigger a "re-assignment event" to the dealer by giving them a tip after a large win, or before they leave the virtual table. In another example, the player could trigger a "re-assignment event" by tipping a member of the wait staff in a virtual environment (e.g., a virtual bartender or a virtual waitress), or tipping a virtual casino host.

Virtual ticket-in ticket-out ("TITO") tickets are another example of a virtual game element that can be assigned to a player upon occurrence of an "initial assignment event" and re-assigned to other entities in the virtual environment upon occurrence of a "re-assignment event". For example, if a player cashes out of an EGM, the EGM may print a virtual TITO ticket, and then an "initial assignment event" is triggered to assign that TITO ticket to the player who is engaged with that virtual EGM. This is an important virtual element to have in a virtual environment as other malicious players could otherwise attempt to steal the virtual TITO ticket as it is printed by the issuing EGM. This player could then perform a "re-assignment event" by inserting the virtual TITO ticket into another EGM on the floor, or performing a buy-in at a virtual table game and converting the amount represented by the virtual TITO ticket to virtual chips. Alternatively, a player in a virtual environment may, as allowed by the rules of the virtual environment, trigger a "re-assignment event" by re-assigning a virtual TITO ticket to another player, such as their spouse.

Virtual dice are another virtual element used in various casino games, such as craps (and its various incarnations), hazard, Chuck-A-Luck, Klondike, Banka Francesca, Sic Bo, etc. In some virtual games, the dealer may throw the dice at the appropriate time in the virtual game. In those embodiments, the virtual dice was initially assigned to the dealer when the virtual table was opened and an "initial assignment event" was triggered, and no further re-assignment event occurs until the table is closed, or the game ends. In other embodiment, after the dice was assigned to the dealer upon occurrence of the "initial assignment event", the dealer may trigger a "re-assignment event" to re-assign the dice to a player at the table so they can trigger the dice roll or action required to determine the game outcome. When the player rolls the dice, they are triggering another "re-assignment event" of the dice to the table or to the dealer, who may then trigger a subsequent "re-assignment event" in the next game, or again before the current game can be completed (if the current game requires multiple dice rolls to complete).

As can be seen in these examples, some of the virtual game elements that can be assigned during the course of operating a virtual game in a virtual environment may have a cash face-value (e.g., virtual TITO ticket or virtual chips), while others may not directly have a cash value (e.g., virtual dice or virtual cards).

Embodiments associated with changing or limiting virtual game element behavior based on assignment are described below. The behavior of a virtual game element may vary based upon who the virtual game element is assigned to. The state of the virtual game itself may also limit the state of a virtual game element in some way. For example, a virtual card may, depending upon the rules of the game, only be viewable by the player who has been assigned that virtual game element. In another embodiment, the virtual game element may be viewable by all players depending upon who the virtual game element is assigned to. For example, in certain virtual table games, if the virtual card is assigned to the dealer, then it may be viewable by all players. In other games, the assignment of the game element may restrict when, during the course of a game, the card or game element may be viewable. For example, in the case of a blackjack game, the dealer is dealt one card face-up, and another card face-down during "the deal", and they can only look at their face-down card after all players have been served. Finally, the state of the game may change to a state where the face-down card can be revealed to other players.

In another embodiment, virtual employees of the casino may be limited on the actions they can perform on certain virtual game elements. For example, when dealing cards in a table game, the dealer can only deal the card on top of a shuffled virtual card pile to players, and they cannot deal the card at the bottom of the virtual card pile. Likewise, when virtual game elements are re-assigned to the dealer or the table at the end of a game, they may be collected and shuffled, and the virtual dealer may not be able to select the order in which the virtual cards are stacked in the virtual deck of cards after they have been re-assigned to the table or re-assigned to the dealer.

The regulator or operator may be able to view more information about the state of a virtual game element in certain scenarios. For example, an employee virtual character may be able to view the face-down player cards dealt to the dealer during the course of a blackjack game before they are revealed to other players. Likewise, a regulator may be able to perform the same action. Information about the state of each virtual game element may be made available to the regulator staff who are outside of the virtual environment for reporting or auditing purposes.

Embodiments associated with player initiated assignment events are described below. In some embodiments players can exchange and interact with elements without triggering the assignment event. For example, one player could steal another player's chips, cards or dice without changing any gaming state. More specially, Player A could steal Player B's chips, but no money is transferred and the chips are still assigned to Player B. Likewise, Player A could hand Player B chips without transferring assignment of the chips or changing the player account balance. In one embodiment, the system returns the items to the assigned player immediately, after a period of time (such as one minute), at the request of the owner, at the request of casino staff or regulators, or at some gambling triggering event (such as leaving the table, placing a wager, cashing out, etc).

In some embodiments, the handing of chips, cards or dice does trigger an assignment event. In this embodiment, if Player A hands Player B a $5 chip, player B is assigned the chip or Player B's account is credited $5 while Player A's account is decremented by $5. The assignment event could happen merely through the action (as it is in the real world) or the interface of the VR/AR system could help a player transfer. For example, if Player A hands Player B a $5 chip, the interface of Player A might ask "Do you want to give Player B $5?" Player A could confirm through the interface using button, motions, or other input mechanisms. The UI could allow Player A to change the amount. Player B might also have an interface for accepting the money ("Do you want to accept $5 from Player A?"). This system allows for either the exact transfer or a loose transfer system meaning that the system could transfer the exact amount of money represented by the virtual chips (ticket, money, bills, coins, etc) or allow the amount to be set by the player(s).

With this system the player could drop or throw chips, money, bills or coins on the floor but not lose the account balance or the ownership of the item(s).

Embodiments associated with blocking and tracking virtual elements are described below. In some embodiments, the system tracks all assignment events. In additional or alternative embodiments, the system records interactions between players. For example, the Player A might show his/her cards to Player B. Player A might do this as part of a cheating scam at a poker table. The system could record that Player B saw the face value of Player A's card. The system could also block Player B from seeing Player A's card. The block could be a general rule, or could be tied to game state. For example, players cannot show each other cards during the game, but can once the game is over.

Embodiments associated with age restrictions and transfer restrictions placed on virtual elements are described below. During a reassignment event, the system might verify the age(s) of the people involved in the action or people near the action. For example, if Person A tries to give gambling chips to Person B, the system might check the age of Player B and accept or deny the transfer based on the age of Player B. The system might prevent a player from giving or showing playing cards to minors as to not encourage minors to gamble. The elements of the gaming system might not allow a minor to interact with them or the system might prevent a minor from seeing elements of the gambling world to prevent a minor from gambling in any way.

In additional or alternative embodiments, the reassignment event triggers a verification of the people involved in the action by comparing the names of the players against a casino or regulatory "black list". This is a list of players who are forbidden by the casino, the operator or the regulatory body from engaging in certain gambling functions. If the players are not eligible to give or receive the asset (initiate a reassignment event), the system can deny the transfer.

Denying a transfer could mean the action is simply impossible (a player simply cannot hand chips to another player) or could mean the action is reverted or reversed (the item is returned).

The verification algorithm could also be more complex than simply validating the sender and receiver of the virtual item (chips, money, cards, dice, etc). The system might take into account the presence of other people, such as a minor within 10 feet or a known card cheater withing 30 feet. The algorithm could take into account the interactions and movements of people over time to make sure the person making the wager at the table (initiating a reassignment event) haven't received money or chips from a person who is not allowed to wager on any game or that game. This would prevent people from somehow giving money to another player to make wagers on their behalf.

The verification could take into account the role of the person for sports wagering. For example, sports wagering rules prevent athletes, coaches, trainers, doctors, physical therapists, team owners, etc. from placing wagers on all or certain games. The system could validate that the person making the AR/VR wager does not fall into one of these categories and is allowed to make the sports wager.

Certain reassignments might require a casino employee or regulator to approve. This could be based on the amount of the transfer, type of transfer or other circumstances. For example, a casino might require an employee confirm any transfers over $10,000, or $100,000 in a day. In another example, the system might require certain approvals to move chips to certain other players or to certain wagers. For example, taking more than 10 times odds in craps on amounts over $1,000 might require operator approval. The system may also track these amounts purely for reporting purposes. For example, in certain jurisdictions, casinos may be required to file anti-money laundering paperwork, such as a Suspicious Activity Report (SAR) or Currency Transaction Report (CTR) based upon the transfer of funds into or out of the casino and between players (cash, chips, electronic funds transfers, etc).

The limits and rules of reassignment events could be tied to player status, such as player account status (gold, silver, bronze) or player status based on amount played, won or wagered over a period of time. It could also be tied to an event in gaming, such as winning a bonus, etc.

The system could limit the amount of transfers by tracking the reassignment of chips and money as to limit the amount of money a person can wager, win or transfer in a period of time. For example, the system might allow a person to only wager $200 per hour on slots, or $10,000 a day on table games or sports wagering.

The system may also require players to file, sign or approve certain paperwork in order to complete a re-assignment event. The requirement to file, sign, or approve a form may be based upon a limit, such as transfer over a certain amount, or a daily, weekly or monthly transfer limit, etc. For example, a player may have to sign a tax form or gift tax form when performing a re-assignment event if the total puts the player's yearly transfers to the other player over $15 k for the current year in the United States.

Figure 6:
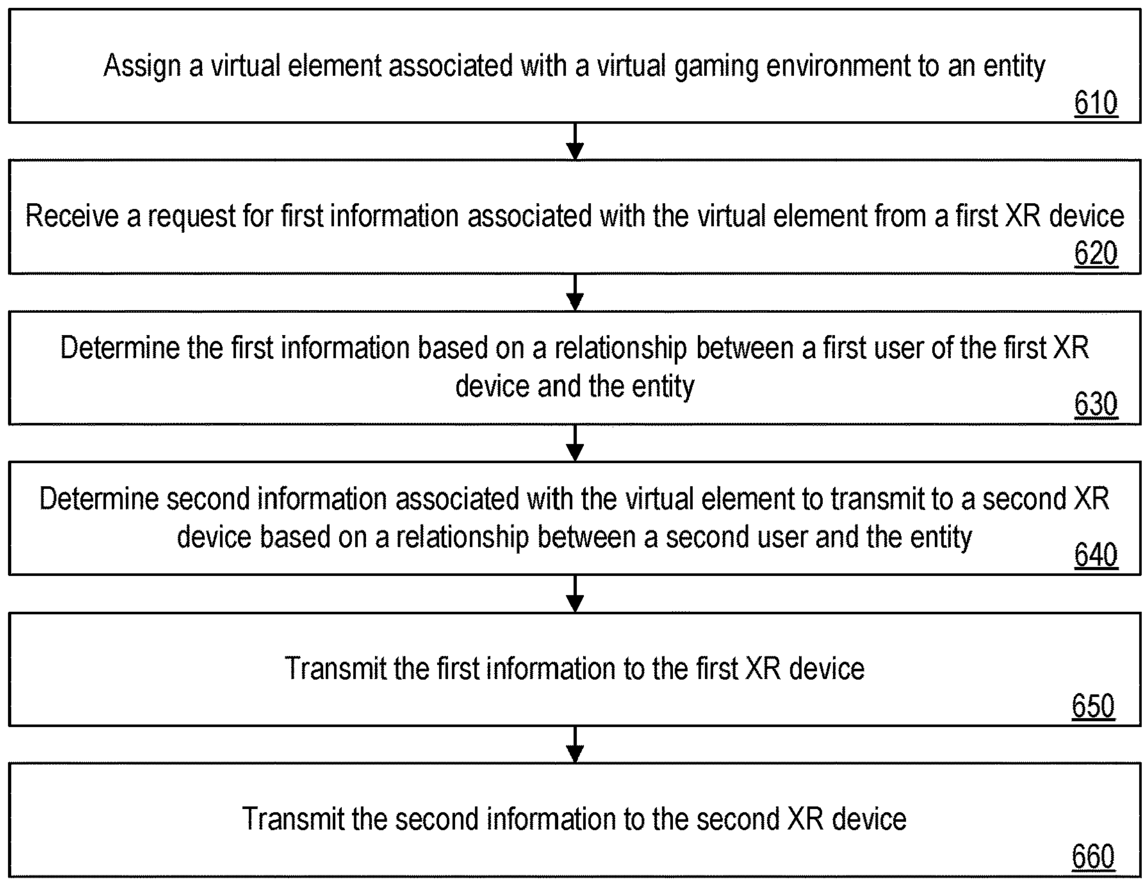
FIG. 6 is a flow chart illustrating an example of operations performed by a system according to some embodiments.

FIG. 6 illustrates an example of operations performed by a system configured to manage a virtual element associated with a virtual gaming environment.

At block 610, processing circuit 42 assigns a virtual element associated with a virtual gaming environment to an entity. In some embodiments, assigning the virtual element includes storing (e.g., in memory 44) an indication that the virtual element is assigned to the entity. In additional or alternative embodiments, the virtual element includes at least one of: a virtual card; a virtual die; a virtual chip; a virtual table; a virtual electronic gaming machine ("EGM"); and a virtual avatar.

At block 620, processing circuit 42 receives, via network interface 46, a request for first information associated with the virtual element from a first XR device.

At block 630, processing circuit 42 determines the first information based on a relationship between a first user of the first XR device and the entity At block 640, processing circuit 42 determines second information associated with the virtual element to transmit to a second XR device based on a relationship between a second user and the entity.

In some embodiments, determining the information (e.g., the first information and/or the second information) includes determining that the virtual element is assigned to the entity based on retrieving the indication (e.g., from memory 44).

In additional or alternative embodiments, the entity includes the user of the XR device (e.g., the first user of the first XR device or the second user of the second XR device). Determining the information includes determining that the virtual element is assigned to the user of the XR device and determining the information based on the virtual element being assigned to the user of the XR device.

In additional or alternative embodiments, the entity is separate from the user of the XR device. In some examples, determining the information includes determining that the user of the XR device is in a contact list of the entity and determining the information based on the user of the XR device being in the contact list of the entity. In additional or alternative examples, determining the information includes determining that the user of the XR device is an opponent of the entity in the virtual gaming environment and determining the information based on the user of the XR device being the opponent of the entity in the virtual gaming environment. In additional or alternative examples, determining the information includes determining that the user of the XR device is a dealer associated with a virtual game in the virtual gaming environment and determining the information based on the user of the XR device being the dealer associated with the virtual game in the virtual gaming environment. In additional or alternative examples, determining the information includes determining that the user of the XR device is an operator of the virtual gaming environment and determining the information based on the user of the XR device being the operator of the virtual gaming environment. In additional or alternative examples, determining the information includes determining that the entity is a dealer associated with a virtual game in the virtual gaming environment and determining the information based on the entity being the dealer associated with the virtual game in the virtual gaming environment.

In additional or alternative embodiments, the virtual element includes a virtual card and the information includes at least one of a value of the virtual card and a presence of the virtual card.

In additional or alternative embodiments, the virtual element includes a virtual chip, and the information includes at least one of a value of the virtual chip and a presence of the virtual chip.

In additional or alternative embodiments, the information includes at least one of: game-specific information associated with use of the virtual element in a virtual game in the virtual gaming environment; and personal information associated with the entity.

In additional or alternative embodiments, the user of the XR device includes at least one of: the entity; a dealer of a virtual game in the virtual gaming environment; an opponent of the entity; a friend of the entity; and an operator of the virtual gaming environment.

In additional or alternative embodiments, the entity includes at least one of: the user of the XR device; a dealer of a virtual game in the virtual gaming environment; an opponent of the user of the XR device; a friend of the user of the XR device; and an operator of the virtual gaming environment.

At block 650, processing circuit 42 transmits, via network interface 46, the first information to the first XR device.

At block 660, processing circuit 42 transmits, via network interface 46, the second information to the second XR device.

Figure 7:
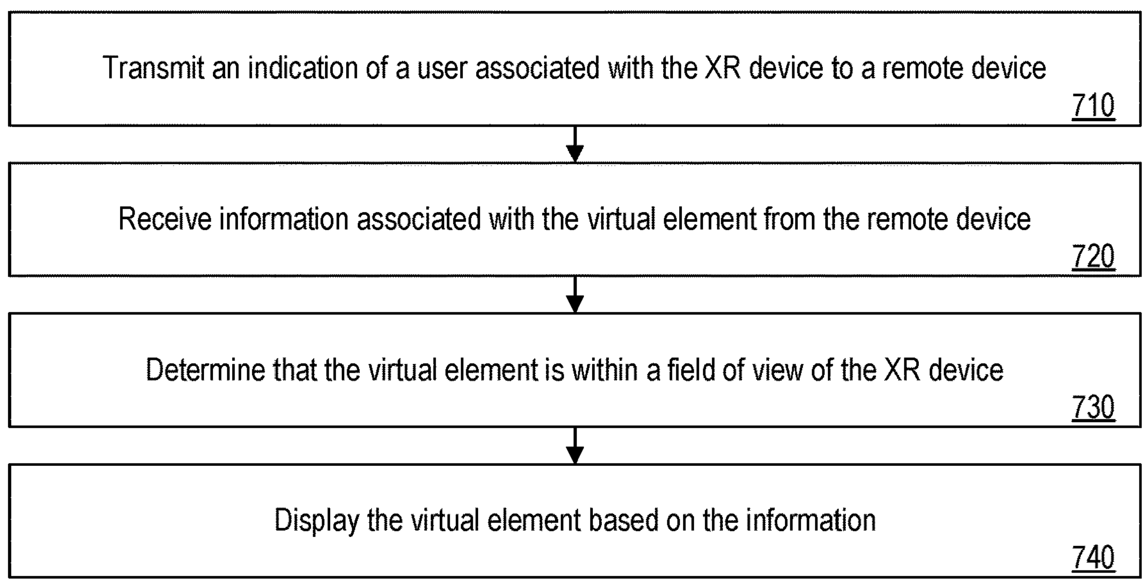
FIG. 7 is a flow chart illustrating an example of operations performed by an extended reality ("XR") device according to some embodiments.

FIG. 7 illustrates an example of operations performed by an XR device configured to display a virtual element of a virtual gaming environment. At block 710, processing circuit 12 transmits, via communication adapter 26, an indication of a user associated with the XR device to a remote device. At block 720, processing circuit 12 receives, via communication adapter 26, information associated with the virtual element from the remote device. At block 730, processing circuit 12 determines that the virtual element is within a field of view of the XR device. At block 740, processing circuit 12 displays, via video controller 30, the virtual element based on the information.

Figure 8:
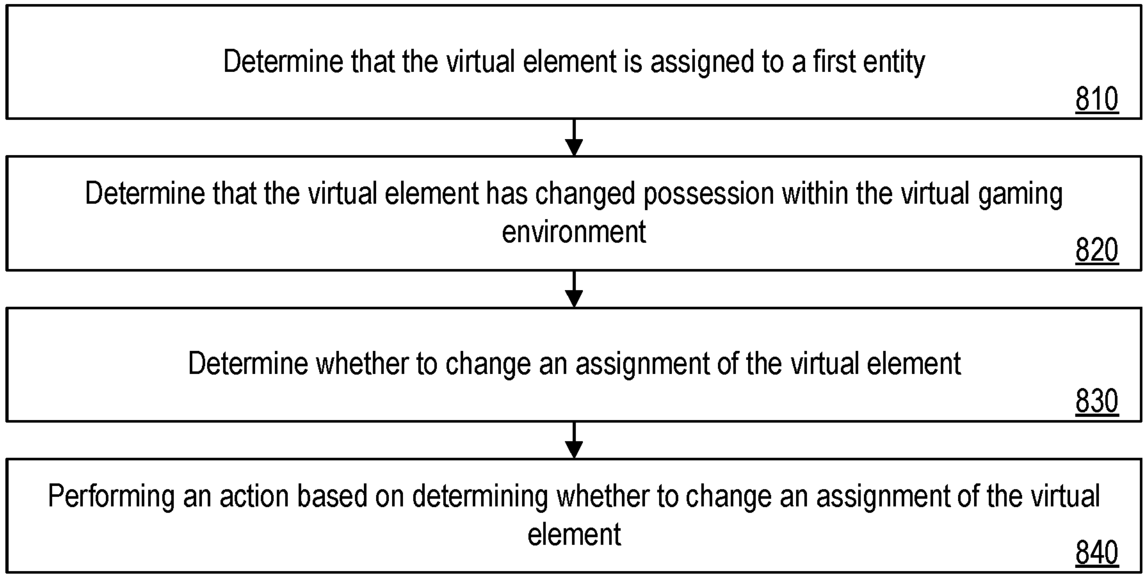
FIG. 8 is a flow chart illustrating an example of operations performed by a system according to some embodiments.

FIG. 8 illustrates an example of operations performed by a system configured to manage assignment of a virtual element associated with a virtual gaming environment.

At block 810, processing circuit 42 determines that the virtual element is assigned to a first entity. In some embodiments, the first entity includes at least one of: a player of a virtual game in the virtual gaming environment; a dealer of the virtual game in the virtual gaming environment; and an operator of the virtual gaming environment. In additional or alternative embodiments, the virtual element includes at least one of: a virtual card; a virtual die; a virtual chip; a virtual table; a virtual electronic gaming machine ("EGM"); and a virtual avatar.

At block 820, processing circuit 42 determines that the virtual element has changed possession within the virtual gaming environment. In some embodiments, determining that the virtual element has changed possession within the virtual gaming environment includes determining that the first entity has virtually moved a threshold virtual distance from the virtual element within the virtual gaming environment. In additional or alternative embodiments, determining that the virtual element has changed possession within the virtual gaming environment includes determining that a second entity has attempted to interact with the virtual element.

At block 830, processing circuit 42 determines whether to change an assignment of the virtual element. In some embodiments, determining whether to maintain assignment of the virtual element to the first entity includes determining to change the assignment of the virtual element. In some examples, determining to change the assignment of the virtual element includes: receiving an indication from a device associated with the first entity indicating to assign the virtual element to the second entity; and determining to change the assignment of the virtual element based on the indication. In additional or alternative examples, determining to change the assignment of the virtual element includes determining that the second entity has authorization to take possession of the virtual element from the first entity; and determining to change the assignment of the virtual element based on determining that the second entity has authorization to take possession of the virtual element from the first entity.

In additional or alternative examples, the virtual element is part of a virtual game in the virtual gaming environment. Determining that the virtual element has changed possession within the virtual gaming environment includes determining that the first entity has given up possession of the virtual element as part of the virtual game. Determining to change the assignment of the virtual element includes determining to change the assignment of the virtual element based on determining that the first entity has given up possession of the virtual element as part of the virtual game.

In additional or alternative embodiments, determining whether to maintain assignment of the virtual element to the first entity includes determining to maintain the assignment of the virtual element to the first entity. In some examples, determining to maintain the assignment of the virtual element includes: receiving an indication from a device associated with the first entity indicating to maintain assignment of the virtual element to the first entity; and determining to maintain the assignment based on the indication.

In additional or alternative examples, determining to maintain the assignment of the virtual element includes: determining that the virtual element has changed possession within the virtual gaming environment from the first entity to a second entity; determining that the second entity does not have authorization to take possession of the virtual element from the first entity; and determining to maintain the assignment of the virtual element based on determining that the second entity does not have authorization to take possession of the virtual element from the first entity. In additional or alternative examples, determining that the second entity does not have authorization to take possession of the virtual element from the first entity includes at least one of: determining an age of the second entity is below a threshold age; determining an amount of the virtual element previously received by the second entity exceeds a threshold amount; and determining that the second entity is not within a predetermined list of authorized entities.

At block 840, processing circuit 42 performs an action based on determining whether to change an assignment of the virtual element. In some embodiments, performing the action includes, responsive to determining to change the assignment of the virtual element, assigning the virtual element to a second entity based on determining to change the assignment of the virtual element. In additional or alternative embodiments, performing the action includes, responsive to determining to maintain the assignment of the virtual element, changing a virtual position of the virtual element based on a virtual position of the first entity.

In additional or alternative embodiments, performing the action includes, responsive to determining to maintain the assignment of the virtual element, preventing at least one of: a change of a virtual position of the virtual element; and an interaction with the virtual element by a second entity.

In additional or alternative embodiments, determining that the virtual element has changed possession includes determining that the virtual element has changed possession from a first entity to a second entity within the virtual gaming environment. Determining whether to change the assignment of the virtual element includes determining to assign the virtual element to the second entity. Performing the action includes, responsive to determining to assign the virtual element to the second entity, assigning the virtual element to the second entity; and transmitting a signal to an XR device associated with the second entity including information associated with the virtual element based on the virtual element being assigned to the second entity.

In additional or alternative embodiments, determining that the virtual element has changed possession includes determining that the virtual element has changed possession from a first entity to a second entity within the virtual gaming environment. Determining whether to change the assignment of the virtual element includes determining to maintain the assignment of the virtual element to the first entity. Performing the action includes transmitting a signal to an XR device associated with the second entity including information associated with the virtual element based on the virtual element not being assigned to the second entity.

Figure 9:
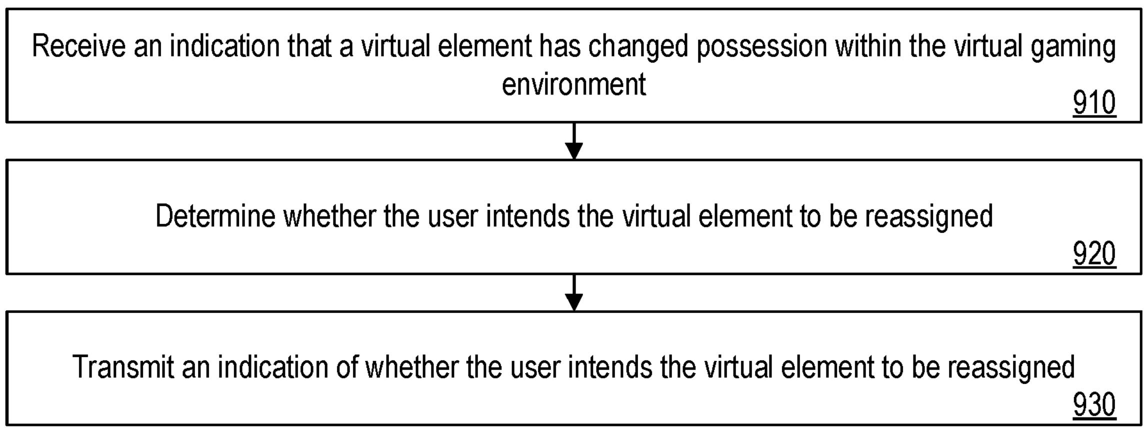
FIG. 9 is a flow chart illustrating an example of operations performed by an extended reality ("XR") device according to some embodiments.

FIG. 9 illustrates an example of operations performed by an XR device configured to manage assignment of a virtual element of a virtual gaming environment. At block 910, processing circuit 12 receives, via communication adapter 26, an indication that a virtual element has changed possession within the virtual gaming environment. At block 920, processing circuit 12 determines whether the user intends the virtual element to be reassigned. At block 930, processing circuit 12 transmits, via communication adapter 26, an indication of whether the user intends the virtual element to be reassigned.

Figure 10:
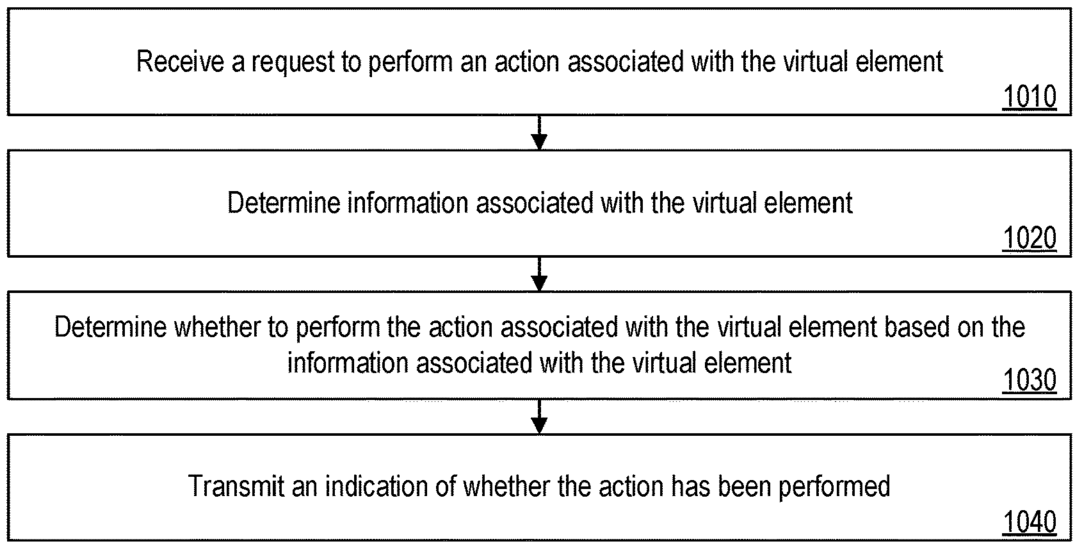
FIGS. 10-11 are flow charts illustrating an example of operations performed by a system according to some embodiments.

FIG. 10 illustrates an example of operations performed by a system configured to manage a virtual element associated with a virtual gaming environment.

At block 1010, processing circuit 42 receives, via network interface 46, a request to perform an action associated with the virtual element. In some embodiments, the virtual element includes at least one of: a virtual deck of cards; a virtual card; a virtual die; a virtual chip; a virtual table; a virtual electronic gaming machine ("EGM"); and a virtual avatar.

At block 1020, processing circuit 42 determines information associated with the virtual element. In some embodiments, receiving the request includes receiving the request from an extended reality ("XR") device associated with a first entity. Determining the information includes determining that the virtual element is assigned to a second entity. The first entity can include at least one of: a dealer of a virtual game in the virtual gaming environment; an opponent of the second entity; a friend of the second entity; and an operator of the virtual gaming environment.

At block 1030, processing circuit 42 determines whether to perform the action associated with the virtual element based on the information associated with the virtual element. In some embodiments, receiving the request includes receiving the request from an extended reality ("XR") device associated with a first entity. Determining whether to perform the action associated with the virtual element includes determining whether to perform the action associated with the virtual element based on the information associated with the virtual element and based on an identity of the first entity. In some examples, determining whether to perform the action associated with the virtual element includes determining whether to perform the action associated with the virtual element based on at least one of: an age of the first entity; an amount wagered by the first entity; and presence of the identity of the first entity on a no-play list.

In additional or alternative embodiments, determining the information includes determining that the virtual element is assigned to a second entity. Determining whether to perform the action associated with the virtual element includes determining whether to perform the action associated with the virtual element based on an identity of the second entity.

In additional or alternative embodiments, determining the information includes determining a list of actions that are permitted to be performed in association with the virtual element. Determining whether to perform the action associated with the virtual element includes determining whether to perform the action associated with the virtual element based on the list of actions that are permitted to be performed in association with the virtual element.

In additional or alternative embodiments, the virtual element includes a virtual deck of cards associated with a virtual game in the virtual gaming environment. Receiving the request includes receiving the request from a dealer associated with the virtual game. The action includes at least one of: shuffling the virtual deck of cards; and dealing at least one virtual card of the virtual deck of cards. Determining information associated with the virtual element includes determining that the virtual element is assigned to the dealer and that the action is included in a list of permitted actions. Determining whether to perform the action includes determining to perform the action based on the action being requested by an entity to which the virtual element is assigned and based on the action being included in the list of permitted actions.

In additional or alternative embodiments, receiving the request includes receiving the request from a first entity. Determining information associated with the virtual element includes determining that the virtual element is assigned to a second entity that is separate from the first entity. Determining whether to perform the action includes determining not to perform the action based on the action being requested by an entity to which the virtual element is not assigned.

In additional or alternative embodiments, the information includes an indication of a restriction on the virtual element. Determining whether to perform the action associated with the virtual element includes determining whether performing the action would violate the restriction. In some examples, the virtual element includes a virtual deck of cards associated with a virtual game in the virtual gaming environment. Receiving the request includes receiving the request from a dealer associated with the virtual game. The action includes dealing at least one virtual card of the virtual deck of cards to a second entity. The restriction includes that the second entity has made a qualified wager. Determining whether to perform the action includes determining to perform the action based determining that the second entity has made the qualified wager.

In additional or alternative examples, the virtual element includes a virtual deck of cards associated with a virtual game in the virtual gaming environment. Receiving the request includes receiving the request from a dealer associated with the virtual game. The action includes dealing a virtual card of the virtual deck of cards. The restriction includes that the virtual card be dealt from the top of the virtual deck of cards. Determining whether to perform the action includes determining to perform the action based determining that the virtual card is on the top of the virtual deck of cards.

At block 1040, processing circuit 42 transmits, via network interface 46, an indication of whether the action has been performed.

Figure 11:
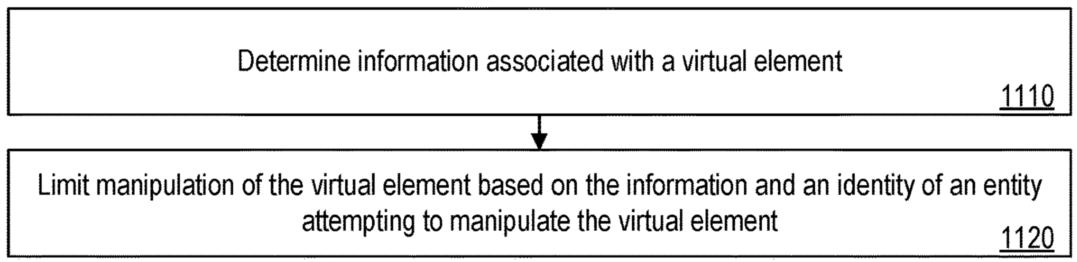

FIG. 11 illustrates an example of operations performed by a system configured to manage a virtual element associated with a virtual gaming environment.

At block 1110, processing circuit 42 determines information associated with the virtual element. In some embodiments, the virtual element includes at least one of: a virtual deck of cards; a virtual card; a virtual die; a virtual chip; a virtual table; a virtual electronic gaming machine ("EGM"); and a virtual avatar.

At block 1120, processing circuit 42 limits manipulation of the virtual element based on the information and an identity of an entity attempting to manipulate the virtual element. In some embodiments, the entity includes a first entity. The information includes at least one of: an identity of a second entity to which the virtual element is assigned;

and a list of actions that are permitted to be performed in association with the virtual element. In some examples, the virtual element includes a virtual deck of cards associated with a virtual game in the virtual gaming environment. The virtual deck of cards can be assigned to a dealer. Limiting the manipulation of the virtual element includes limiting an ability to shuffle and/or deal the virtual deck of cards to the dealer In additional or alternative embodiments, the first entity includes at least one of: a dealer of a virtual game in the virtual gaming environment; an opponent of the second entity; a friend of the second entity; and an operator of the virtual gaming environment.

In additional or alternative embodiments, the information includes an indication of a restriction on the virtual element. Limiting the manipulation of the virtual element includes limiting the manipulation of the virtual element based on ensuring the restriction is met.

In additional or alternative embodiments, the virtual element includes a virtual card of a virtual deck of cards associated with a virtual game in the virtual gaming environment. The restriction includes at least one of: that a second entity has made a qualified wager; and that virtual card be dealt from the top of the virtual deck of cards. Limiting the manipulation of the virtual element includes preventing the entity from dealing the virtual card in response to the second entity having not made the qualified wager and/or the virtual card not being on the top of the virtual deck of cards.

Figure 12:
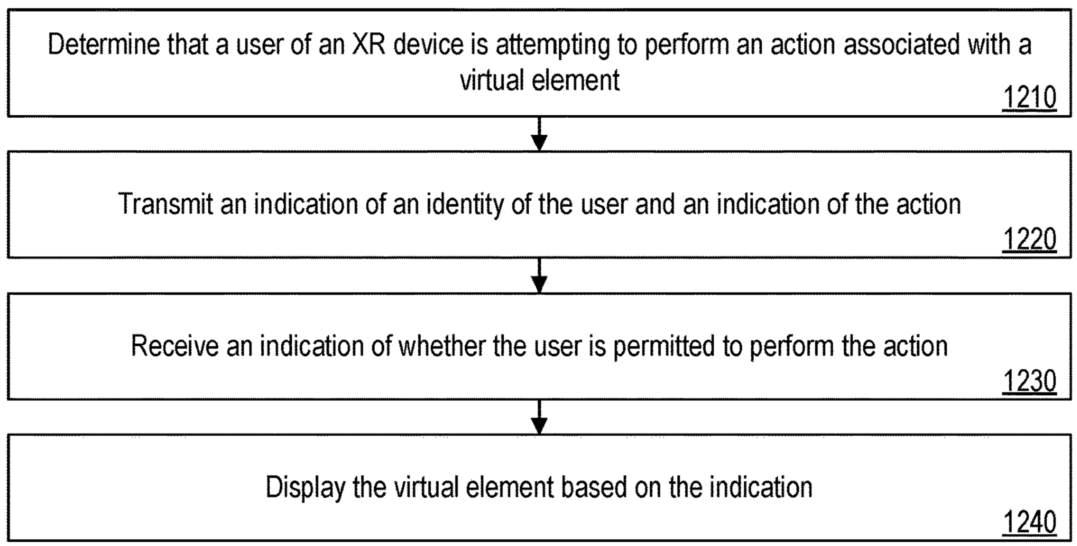
FIG. 12 is a flow chart illustrating an example of operations performed by an extended reality ("XR") device according to some embodiments.

FIG. 12 illustrates an example of operations performed by an XR device configured to manage a virtual element of a virtual gaming environment. At block 1210, processing circuit 12 determines that a user of the XR device is attempting to perform an action associated with the virtual element. At block 1220, processing circuit 12 transmits, via communication adapter 26, an indication of an identity of the user and an indication of the action. At block 1230, processing circuit 12 receives, via communication adapter 26, an indication of whether the user is permitted to perform the action. At block 1240, processing circuit 12 displays, via video controller 30, the virtual element based on the indication.

Figure 13:
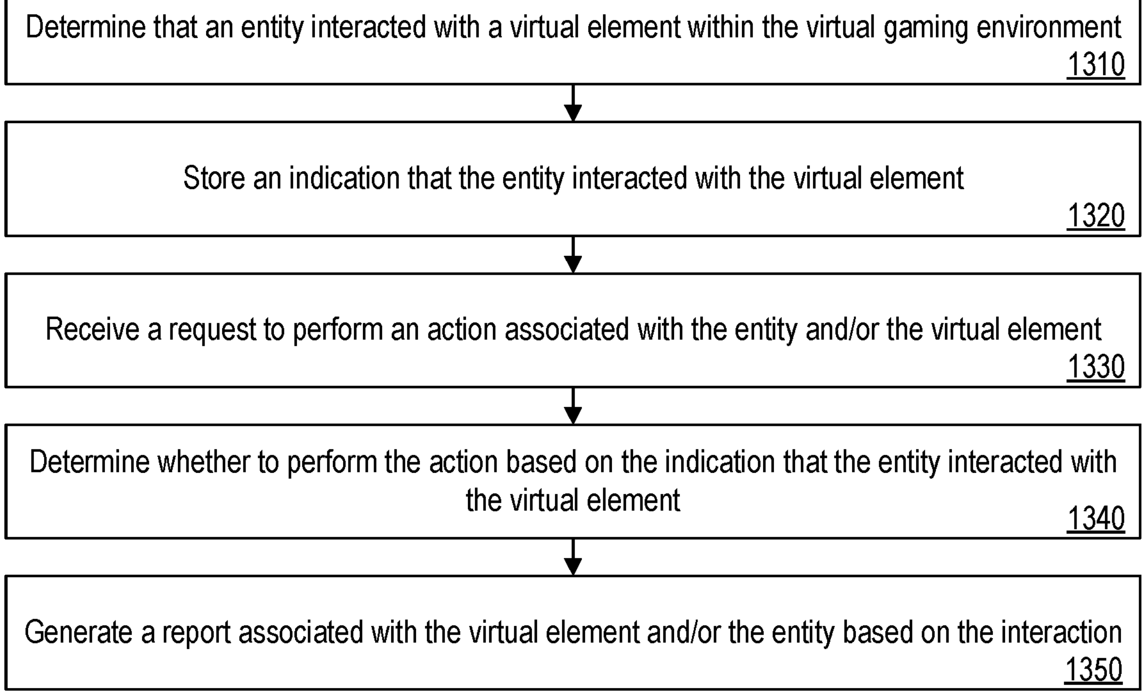
FIG. 13 is a flow chart illustrating an example of operations performed by a system according to some embodiments.

FIG. 13 illustrates an example of operations performed by a system configured to monitor a virtual element associated with a virtual gaming environment.

At block 1310, processing circuit 42 determines that an entity interacted with a virtual element within the virtual gaming environment. In some embodiments, determining that the entity has interacted with the virtual element includes determining at least one of: that the entity has taken possession of the virtual element; that the entity has given up possession of the virtual element; and that the entity has used the virtual element as part of a virtual game in the virtual gaming environment.

In additional or alternative embodiments, determining that the entity has interacted with the virtual element includes receiving an indication that the entity has interacted with the virtual element from an extended reality ("XR") device.

In additional or alternative embodiments, the entity includes at least one of: the user of the XR device; a dealer of a virtual game in the virtual gaming environment; an opponent of the user of the XR device; a friend of the user of the XR device; and an operator of the virtual gaming environment.

In additional or alternative embodiments, the virtual element includes at least one of: a virtual card; a virtual die; a virtual chip; a virtual table; a virtual electronic gaming machine ("EGM"); and a virtual avatar.

At block 1320, processing circuit 42 stores, via memory 44, an indication that the entity interacted with the virtual element.

At block 1330, processing circuit 42 receives, via network interface 46, a request to perform an action associated with the entity and/or the virtual element.

At block 1340, processing circuit 42 determines whether to perform the action based on the indication that the entity interacted with the virtual element. In some embodiments, the virtual element includes a virtual currency. Receiving the request to perform the action includes receiving a request to place a wager using the virtual currency. Determining whether to perform the action includes determining not to place the wager based on the indication that the entity interacted with the virtual element. In some examples, the entity is a first entity that is unauthorized to place the wager. Determining that the entity interacted with the virtual element within the virtual gaming environment includes determining that the first entity provided the virtual currency to a second entity. Receiving the request to place a wager using the virtual currency includes receiving the request to place the wager using the virtual currency from the second entity. Determining whether to perform the action includes determining not to place the wager based on the first entity having provided the virtual currency to the second entity.

At block 1350, processing circuit 42 generates a report associated with the virtual element and/or the entity based on the interaction. In some embodiments, generating the report includes generating a chain-of-custody report associated with the virtual element. In additional or alternative embodiments, generating the report includes generating a list of taxable events associated with the entity.

Figure 14:
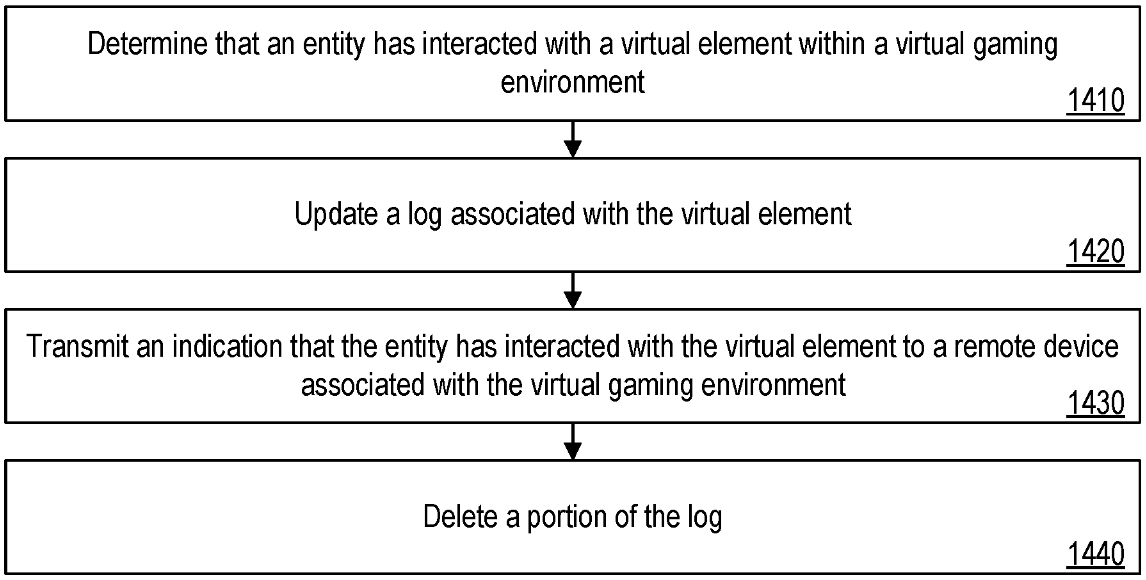
FIG. 14 is a flow chart illustrating an example of operations performed by an extended reality ("XR") device according to some embodiments.

FIG. 14 illustrates an example of operations performed by an XR device configured to monitor a virtual element of a virtual gaming environment.

At block 1410, processing circuit 12 determines that an entity has interacted with a virtual element within a virtual gaming environment. In some embodiments, determining that the entity has interacted with the virtual element includes determining at least one of: that the entity has taken possession of the virtual element; that the entity has given up possession of the virtual element; and that the entity has used the virtual element as part of a virtual game in the virtual gaming environment.

In additional or alternative embodiments, the entity includes at least one of: the user of the XR device; a dealer of a virtual game in the virtual gaming environment; an opponent of the user of the XR device; a friend of the user of the XR device; and an operator of the virtual gaming environment.

In additional or alternative embodiments, the virtual element includes at least one of: a virtual card; a virtual die; a virtual chip; a virtual table; a virtual electronic gaming machine ("EGM"); and a virtual avatar.

At block 1420, processing circuit 12 updates, via data storage 22, a log associated with the virtual element.

At block 1430, processing circuit 12 transmits, via communication adapter 26, an indication that the entity has interacted with the virtual element to a remote device associated with the virtual gaming environment. In some embodiments, transmitting the indication to the remote device includes, responsive to a triggering event, transmitting information associated with the log to the remote device.

At block 1440, processing circuit 12 deletes, via data storage 22, a portion of the log.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system configured to manage a virtual element associated with a virtual gaming environment, the system comprising:

a processor circuit; and a memory coupled to the processor circuit, the memory comprising machine-readable instructions that, when executed by the processor circuit, cause the system to perform operations comprising:

determining information associated with the virtual element to transmit to an extended reality ("XR") device based on a relationship between a user of the XR device and an entity to which the virtual element is assigned, the information including an indication of how to display the virtual element; and transmitting the information to the XR device.

2. The system of claim 1, the operations further comprising:

assigning the virtual element associated with the virtual gaming environment to the entity, wherein determining the information comprises determining the information subsequent to assigning the virtual element to the entity.

3. The system of claim 2, wherein assigning the virtual element comprises storing an indication that the virtual element is assigned to the entity, and wherein determining the information comprises determining that the virtual element is assigned to the entity based on retrieving the indication.

4. The system of claim 1, wherein the entity comprises the user of the XR device, and wherein determining the information comprises:

determining that the virtual element is assigned to the user of the XR device; and determining the information based on the virtual element being assigned to the user of the XR device.

5. The system of claim 1, wherein the entity is separate from the user of the XR device, and wherein determining the information comprises:

determining that the user of the XR device is in a contact list of the entity; and determining the information based on the user of the XR device being in the contact list of the entity.

6. The system of claim 1, wherein the entity is separate from the user of the XR device, and wherein determining the information comprises:

determining that the user of the XR device is an opponent of the entity in the virtual gaming environment; and determining the information based on the user of the XR device being the opponent of the entity in the virtual gaming environment.

7. The system of claim 1, wherein the entity is separate from the user of the XR device, and wherein determining the information comprises:

determining that the user of the XR device is a dealer associated with a virtual game in the virtual gaming environment; and determining the information based on the user of the XR device being the dealer associated with the virtual game in the virtual gaming environment.

8. The system of claim 1, wherein the entity is separate from the user of the XR device, and wherein determining the information comprises:

determining that the user of the XR device is an operator of the virtual gaming environment; and determining the information based on the user of the XR device being the operator of the virtual gaming environment.

9. The system of claim 1, wherein the entity is separate from the user of the XR device, and wherein determining the information comprises:

determining that the entity is a dealer associated with a virtual game in the virtual gaming environment; and determining the information based on the entity being the dealer associated with the virtual game in the virtual gaming environment.

10. The system of claim 1, the operations further comprising:

subsequent to assigning the virtual element to the entity, receiving a request for the information from the XR device, wherein determining the information comprises determining the information in response to receiving the request for the information from the XR device.

11. The system of claim 1, wherein the user is a first user, wherein the XR device is a first XR device, wherein the information is first information, the operations further comprising:

subsequent to assigning the virtual element to the entity, determining second information associated with the virtual element to transmit to a second XR device based on relationship between a second user of the second XR device and the entity, the second user being separate from the first user; and transmitting the second information to the second XR device, the second information being different than the first information.

12. The system of claim 1, wherein the virtual element comprises a virtual card, and wherein the information comprises at least one of:

a value of the virtual card; and a presence of the virtual card.

13. The system of claim 1, wherein the virtual element comprises a virtual chip, and wherein the information comprises at least one of:

a value of the virtual chip; and a presence of the virtual chip.

14. A method of managing a virtual element associated with a virtual game in a virtual gaming environment, the method comprising:

storing an indication that the virtual element is assigned to an entity;

determining information associated with the virtual element to transmit to an extended reality ("XR") device based on an identity of a user of the XR device and/or based on an identity of the entity, the information including an indication of how to display the virtual element; and transmitting the information to the XR device.

15. The method of claim 14, wherein the user is a first user, wherein the XR device is a first XR device, wherein the information is first information, the method further comprising:

determining second information associated with the virtual element to transmit to a second XR device based on an identity of a second user of the second XR device and/or based on the identity of the entity, the second user being separate from the first user; and transmitting the second information to the second XR device, the second information being different than the first information.

16. The method of claim 14, wherein the information comprises at least one of:

game-specific information associated with use of the virtual element in a virtual game in the virtual gaming environment; and personal information associated with the entity.

17. The method of claim 14, wherein the user of the XR device comprises at least one of:

the entity;

a dealer of a virtual game in the virtual gaming environment;

an opponent of the entity;

a friend of the entity; and an operator of the virtual gaming environment.

18. The method of claim 14, wherein the entity comprises at least one of:

the user of the XR device;

a dealer of a virtual game in the virtual gaming environment;

an opponent of the user of the XR device;

a friend of the user of the XR device; and an operator of the virtual gaming environment.

19. The method of claim 14, wherein the virtual element comprises at least one of:

a virtual card;

a virtual die;

a virtual chip;

a virtual table;

a virtual electronic gaming machine ("EGM"); and a virtual avatar.

20. An extended reality ("XR") device configured to display a virtual element of a virtual gaming environment, the XR device comprising:

a processor circuit; and a memory coupled to the processor circuit, the memory comprising machine-readable instructions that, when executed by the processor circuit, cause the XR device to perform operations comprising:

transmitting an indication of a user associated with the XR device to a remote device;

subsequent to transmitting the indication of the user associated with the XR device to the remote device, receiving information associated with the virtual element from the remote device, the information indicating how to display the virtual element based on a relationship between the user and an entity to which the virtual element is assigned;

determining that the virtual element is within a field of view of the XR device; and displaying the virtual element based on the information.

* * * * *